United States Patent [19]

Martin

[11] Patent Number: 5,642,519

[45] Date of Patent: Jun. 24, 1997

[54] SPEECH INTERPRETER WITH A UNIFIED GRAMMER COMPILER

[75] Inventor: Paul A. Martin, Arlington, Mass.

[73] Assignee: Sun Microsystems, Inc., Mountain View, Calif.

[21] Appl. No.: 235,046

[22] Filed: Apr. 29, 1994

[51] Int. Cl.$^6$ .................................................. G06F 17/27
[52] U.S. Cl. ........................................ 395/759; 395/2.64
[58] Field of Search ........................... 395/751, 759, 395/760, 613, 707, 708, 2.6, 2.64, 2.66

[56] References Cited

U.S. PATENT DOCUMENTS

| | | | |
|---|---|---|---|
| 4,984,178 | 1/1991 | Hemphill et al. | 395/2.64 |
| 5,475,588 | 12/1995 | Schabes et al. | 395/759 |

*Primary Examiner*—Jeffery Hofsass
*Assistant Examiner*—Andrew Hill
*Attorney, Agent, or Firm*—Matthew Rainey

[57] ABSTRACT

The present invention provides a unified grammar for a speech interpreter capable of real-time speech understanding for user applications running on a general purpose microprocessor-based computer. The speech interpreter includes a unified grammar (UG) compiler, a speech recognizer and a natural language (NL) processor. The UG compiler receives a common UG lexicon and unified grammar description, and generates harmonized speech recognition (SR) and NL grammars for the speech recognizer and natural language processor, respectively. The lexicon includes a plurality of UG word entries having predefined characteristics, i.e., features, while the UG description includes a plurality of complex UG rules which define grammatically allowable word sequences. The UG compiler converts the complex UG rules (complex UG rules include augmentations for constraining the UG rules) into permissible SR word sequences and SR simple rules (simple rules do not include any augmentation) for the SR grammar. The SR grammar is a compact representation of the SR word entries corresponding to the UG word entries, permissible SR word sequences and simple SR rules corresponding to the augmentations of the complex UG rules. The NL grammar provides the NL processor with NL patterns enabling the NL processor to extract the meaning of the validated word sequences passed from the speech recognizer.

45 Claims, 13 Drawing Sheets

SPEECH INTERPRETER WITH A UNIFIED GRAMMER COMPILER

BACKGROUND OF THE INVENTION

1. This invention relates to speech understanding and in particular to a speech interpreter capable of real-time speech understanding.

1. Description of the Related Art

Real-time computer-based speech interpretation mimics two distinct human cognitive processes. First, a speech recognizer converts an incoming stream of sounds into a likely sequence of words. Next, a natural language processor attempts to make sense of these words, i.e., extract the meaning relevant to a specific user application from the sequence of words. Historically, due to computational limitations of general purpose computers, real-time speech analysis has been accomplished with the aid of elaborate dedicated hardware, such as digital signal processors. However, with recent increases in computational power of microprocessors, real-time speech interpretation of digitized speech can now be accomplished entirely by software running on a general purpose microprocessor-based computer.

FIG. 1 shows a conventional system for speech interpretation including a speech interpreter 100 and a target user application (not shown) which are primarily software programs and are both loaded into the memory (not shown) of a computer. Interpreter 100 includes a conventional speech recognizer 120, a conventional natural language (NL) processor 130 and an application command translator 140 coupled together in series. Speech interpreter 100 further includes an NL description compiler 135 coupled to NL processor 130 for converting an NL description into an NL grammar. A speech recognition (SR) grammar is provided to speech recognizer 120.

Speech interpreter 100 is also coupled to an acoustic input device 110. Acoustic input device 110 converts an input speech stream produced by a human user 105 into a machine readable form. In a digital computer implementation, acoustic input device 110 includes an analog-to-digital (A/D) converter for digitizing the speech. Next, using an internal finite-state machine (defined by the SR grammar) as a template, speech recognizer 120 converts the digitized speech into sequences of recognized words. NL processor 130 compares these sequences of words with internal patterns defined by the NL grammar from NL compiler 135, recognizes permissible sentences, and produces corresponding summary structures representing the permissible sentences for application command translator 140. Translator 140 then matches the summary structures with a known set of user application commands, returning the appropriate command(s) to the user application (not shown) for further processing.

At first blush, considering how facile the human listener is at understanding speech in real time, intuitively, programming computers to perform speech interpretation would seem to be a trivial undertaking. However, in reality, programming computers to perform real-time interpretation of continuous speech from a large variety of speakers using a large vocabulary while maintaining a low error rate has proven to be a very elusive undertaking. Presently, commercially acceptable error rates (greater than 90% of words correctly understood) have either been achieved by "training" the prior art speech recognizer 120 to work for only a small set of human speakers, i.e., a speaker-dependent system, and/or by severely limiting the vocabulary and grammar.

The speech interpretation problem is two-fold. Both SR and NL processing of the complete vocabulary of the English language are extremely formidable undertakings. Testing acoustical input sounds against an unrestricted language with a large vocabulary is not a realistic SR undertaking. The concept of perplexity is used to quantify the degree of difficulty of the SR task, i.e., the problems of which sequences of words are permissible combined with the problems associated with a vocabulary size. Perplexity is defined as the average number of "equally likely" words a speech recognizer has to choose among at an average word boundary. Hence, perplexity, in the absence of probabilities of words or of sequences of words, is equal to the total vocabulary size.

Fortunately, in many computer-based user applications, the vocabulary, i.e., command set, is fairly limited and the grammar defining permissible word sequences can be quite rigid, typically yielding a perplexity of about 50. The rigidity associated with such a sub-set of the English language makes real time NL understanding a realistic computational task for these user applications running on a microprocessor-based computer. As a result, conventional SRs and NL processors are able to process speaker-independent speech in real time with an acceptable success rate by using SR and NL grammars which significantly constrain the search of possible words and sequences allowed in the language.

Because their functions are so disparate, SR and NL processing present different challenges. SR involves the transformation of the digitized speech into "likely" sequences of words, while NL processing involves extracting meaning for a given application from the (possibly erroneous) input sequences of words. Furthermore, SR involves "shallow" processing of massive amounts of data, whereas NL understanding typically involves "deep" processing of much more modest quantities of data.

Prior art speech recognizers use a separate SR grammar to constrain the search to those sequences of words which likely are permissible in an application so as to improve the recognition rate and accuracy of speech recognizer 120. Typically, an SR grammar defines a simple finite state structure which corresponds to a relatively small number of permissible word sequences without any concern or need for deciphering the meaning or sense of these sequences. Because a typical SR finite state structure is a simple and "shallow" structure, conventional programming tools for expressing the SR grammars are equally primitive. As such, writing an SR grammar for a speech recognizer resembles the task of coding in an assembler programming language: it is very laborious and tedious, and the output is not easily comprehensible. Further, in order to achieve the highest performance in both space/time tradeoffs and to minimize the perplexity, SR grammars require adherence to idiosyncratic restrictions to accommodate the syntactical constraints imposed by a particular speech recognizer.

For example, in a login sequence for a user application, a list of permissible user full names is limited to "Bob Jones", "Jane Smith", "Jane Jones" and "Pete Baker". A typical SR grammar rule for such an application defining the alternative full names can be codified as:

$fullname: (Bob Jones|Jane Smith|Jane Jones|Pete Baker)[1];

[1] A "$" symbol precedes an SR rule name and an SR rule element name.

The above SR grammar rule is accurate but is very expansive and tedious to implement for a large set of user names. A sophisticated speech recognizer may accept a slightly more powerful and flexible version of the SR grammar rule such as:

$fullname: $firstname $lastname;
$firstname: (Bob|Jane|Pete);
$lastname: (Jones|Smith|Baker);

The problem with the second version is that it is too permissive, i.e., it does not have any means for constraining and eliminating invalid permutations of first and last names. As such, "Bob Smith" and "Pete Jones" will also be erroneously accepted by speech recognizer 120 and invalid full names will be forwarded to NL processor 130.

In contrast, NL processor 130 receives likely sequences of words (sentences) from speech recognizer 120 and compares each sentence with a plurality of internal NL patterns defined by the NL grammar in order to extract the "meaning" of the word sequence. This is accomplished by computing a phrase pattern for each sentence which corresponds to an NL pattern implicitly expressed by the underlying NL grammar definitions representing permissible phrase structures. For example, upon recognizing a word from a "name" list, an NL grammar rule may cause NL processor 130 to parse subsequent words searching for a word from a "verb" list.

These lists, e.g., "name", "verb", are expressed using a number of programing tools which simplify the generation of a description of an NL grammar. The tools include a lexicon (word library) defining permissible words and their features; these features are used for testing and for encoding meaning by the NL grammar. Another programming tool provides the capability for expressing a set of NL tests in an NL descriptive language thereby creating a more perspicuous mechanism for expressing a rule restriction. Similarly, "actions" (assignments) associated with the NL grammar support the extraction of "meaning" from the word sequences. Because coding an NL description is accomplished using a broader and more powerful set of programming tools, it more nearly resembles coding in a high level programming language, a task which is easier to accomplish efficiently and accurately.

The above described conventional speech interpreter 100 using separately generated SR and NL grammars has several disadvantages. These disadvantages arise primarily from the crucial need to harmonize the SR and NL grammars to ensure that speech recognizer 120 will function "cooperatively" with NL processor 130.

One problem is the critical tradeoff between the "tightness" of the SR grammar (controlling the perplexity encountered by speech recognizer 120) and the performance of NL processor 130. If the SR grammar is too tight, i.e., the word sequence filtering too restrictive, then a substantial amount of useful word sequences, such as slightly mispronounced words or sequences with inconsequential grammatical error(s), will be rejected by speech recognizer 120 and not reach NL processor 130. The unintended rejection of otherwise useful word sequences causes NL processor 130 to receive either a less likely word sequence or cause an outright loss of a command or answer. As a result, the user application will have to request a repetition of the command or answer and eventually annoy human user 105.

Conversely, if the SR grammar is too "loose", then speech recognizer 120 is guessing without adequate constraints necessary for achieving good recognition results causing NL processor 130 to receive too many incorrect word sequences, such that NL processor 130 is presented the equivalent of an avalanche of "word salads". As a result, the performance of NL processor 130 is degraded since speech recognizer 120 has failed to function as an effective front end filter.

Another difficulty arises whenever a change is made to the vocabulary or grammar of the user application, e.g., adding a new command/user-name or a new allowable formalism/expression of a command. Such changes, no matter how trivial, must be made to both the SR and NL grammars. These simultaneous changes must be harmonized or there will be a breakdown in the internal operation of speech interpreter 100. This harmonization requirement is even more problematic because of the generally weaker conventional formalisms available for expressing the SR grammars.

As discussed above, the SR and NL grammars control differing processes, word sequence matching versus meaning extraction, i.e., speech recognizer 120 is involved with the low level process of word recognition while NL recognizer 130 is involved in the relatively higher level process of understanding commands and/or answers from human user 105. For example, NL processor 130 focuses on abstracting the meaning of a word or phrase, thereby effectively treating the word pairs "I am", "I is", "I are", "Me am", "Me is" and "Me are" as having the same meaning, even though only the first of these word pairs is grammatically correct.

As such, it is counter-intuitive to attempt to unify the SR and NL processes (and their respective grammars). Using a high level language versus an assembler language analogy, generally a programmer would not write code in a high level language if the syntax and the order of the eventual individual object code instructions were of particular concern. This is because when coding in a high level language, the programmer is primarily concerned with the function of a routine rather than its exact representation, trading off control of the details for ease of expression.

Hence, there is a need to unify and consolidate the two presently distinct processes of implementing the SR and NL grammars by adopting the use of programming tools presently only available for generating NL grammars. Such a unification would drastically reduce the programming effort required to implement and maintain a harmonized set of SR and NL grammars. More importantly, the resulting unified grammar will be more robust and effective.

SUMMARY OF THE INVENTION

The present invention provides a unified grammar for speech interpreter capable of real-time speech understanding for user applications running on a general purpose microprocessor-based computer. The speech interpreter according to the invention includes a unified grammar (UG) compiler, a speech recognizer and a natural language (NL) processor. The UG compiler receives a common UG lexicon and unified grammar description, and generates a speech recognition (SR) grammar and an NL grammar for the speech recognizer and natural language processor, respectively.

The lexicon includes a plurality of UG word entries having predefined characteristics, i.e., features, while the UG description includes a plurality of complex UG rules defining grammatically allowable word sequences. The SR grammar includes a plurality of SR word entries corresponding to the plurality of UG word entries, and a plurality of permissible SR word sequences and simple SR rules corresponding to the augmentation of the complex UG rules. Hence, the SR grammar provides the speech recognizer with a compact representation of the SR word entries, permissible SR word sequences and simple SR rules. In contrast, the NL grammar provides the NL processor with NL patterns enabling the NL processor to extract the meaning of the permissible word sequences passed from the speech recognizer. A command translator is also provided for interfacing the speech interpreter with a user application.

In accordance with one aspect of the invention, the SR and NL grammars are derived from a compilation of a common source, i.e., the common unified grammar description, both of which lexicon, both of which are codified in a readable and easily grammar "high level" descriptive format. The harmonization of the UG compilation process to produce compatible SR and NL grammars is possible because the UG compiler converts the complex UG rules (complex UG rules include augmentations for constraining the rules) of the unified grammar description into permissible SR word sequences and SR simple rules (simple rules do not include any augmentation) for the SR grammar.

In one embodiment of the invention, an acoustic device is coupled to the speech recognizer for converting speech into a digital signal for the speech interpreter. In other embodiments, the input speech is digitized remotely and provided to the speech interpreter in a standard digitized form such as an ISDN telephony signal. In some embodiments, the speech interpreter and associated user applications are coupled to a speech synthesizer for converting text into speech.

The speech interpreter of the present invention has a number of advantages over the prior art. By harmonizing and simplifying the production of the SR and NL grammars, the programming of new UG lexicons and unified grammar descriptions for new user applications, and the modification of existing lexicons and unified grammar descriptions for existing user applications are both greatly simplified. In addition to the programming efficiency, the resulting harmonized SR and NL grammars are more robust and improve the interoperability of the speech recognizer and NL processor. Accordingly, the speech interpreter of the present invention may be readily used as a building block in many of today's user applications which requires a "hands-free" operator or for a motion-impaired user.

DESCRIPTION OF THE DRAWINGS

The objects, features and advantages of the system of the present invention will be apparent from the following description in which.

NOTATIONS AND NOMENCLATURE

BNF or Backus-Naur form: a meta-language used for defining the syntax of formal language.

CFG: Context Free Grammar is a formalism in which rules refer only to their contents without regard to their surroundings.

FSA: Finite State Automata is a formalism (weaker than the CFG) which can be represented as a set of nodes and transition arcs between them.

HMM: Hidden Markov Model: a probablistic FSA where the probabilities are "trained" to teach it to recognize the elements of speech.

NL: Natural Language

SR: Speech Recognition

SWIFTUS: SoftWare Instead of Fastus for Text Under-Standing is a natural language processor developed by Sun Microsystems Laboratories, Inc., Mountain View, Calif. (see also FASTUS: A system for extracting information from text. In proceedings of the ARPA Human Language Technology Workshop, pages 133–137, Plainsboro, N.J. March, 1993).

TTS: Text To Speech

UG: Unified Grammar

Terminals: (defined) words

Non-terminals: <noun>, <adjective>etc. i.e., the result of applying a named rule

DETAILED DESCRIPTION OF THE INVENTION

The following detailed description has been divided into several sections. The first section describes a general hardware system arrangement for the installation and operation of a speech interpreter of the present invention. Subsequent sections describe various functional aspects of the invention, such the formats of the input files for the unified grammar (UG) compiler, the respective compilation processes for producing the speech recognition (SR) and natural language (NL) grammars, as well as the overall structure and operation of the present invention's speech recognizer and NL processor.

In this description, numerous details provide a thorough understanding of the present invention. These details include functional blocks, flowcharts, Backus-Naur form (BNF) definitions and LISP definitions to assist a developer in using the speech interpreter. In addition, the speech interpreter of the invention is described with reference to a specific implementation, but the invention is applicable to a wide variety of user interfaces and environments. In other instances, well-known circuits and structures are not described in detail so as not to obscure the invention unnecessarily.

(i) General Hardware System Configuration

Figure 1:
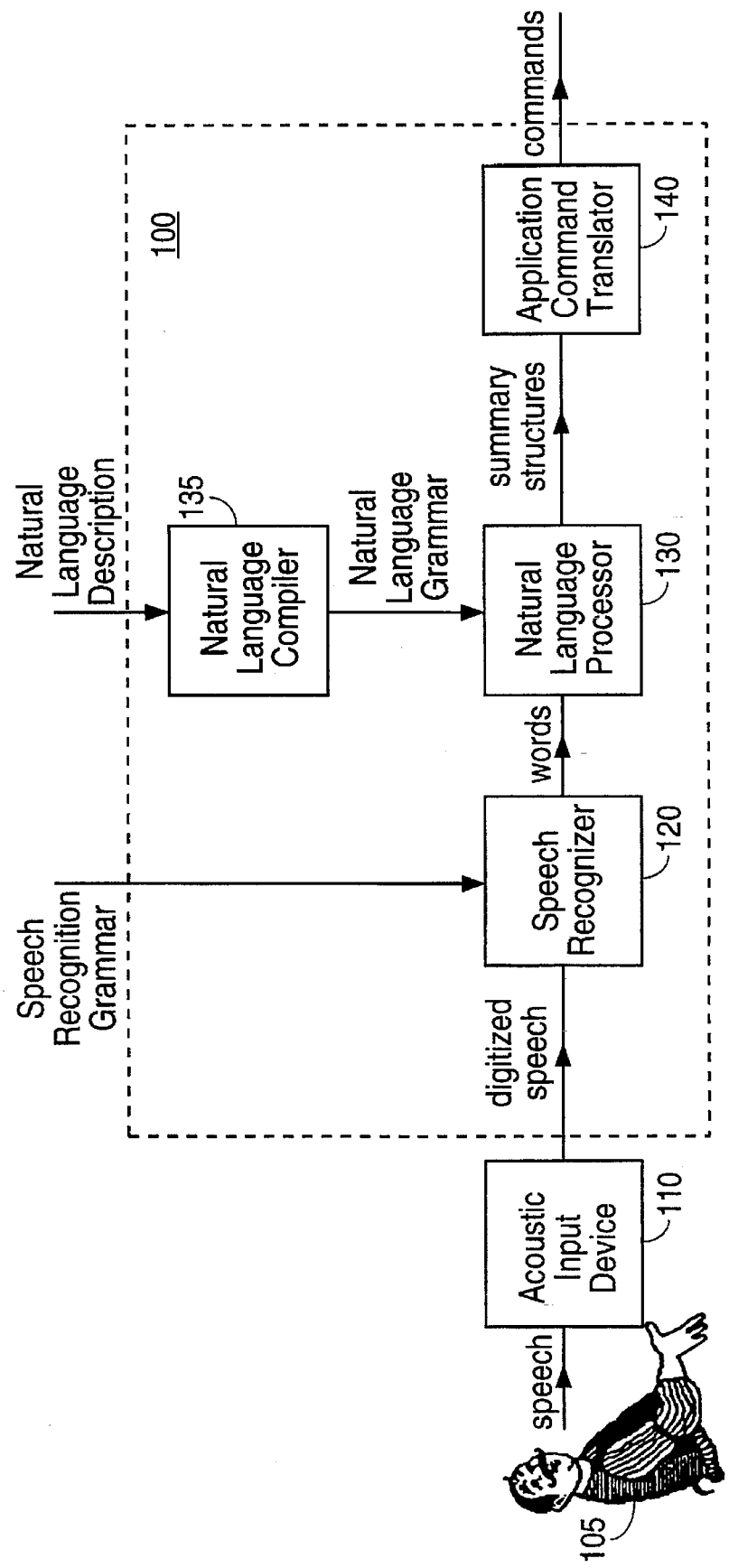
FIG. 1 is a block diagram of a prior art speech interpretation system.
Figure 2:
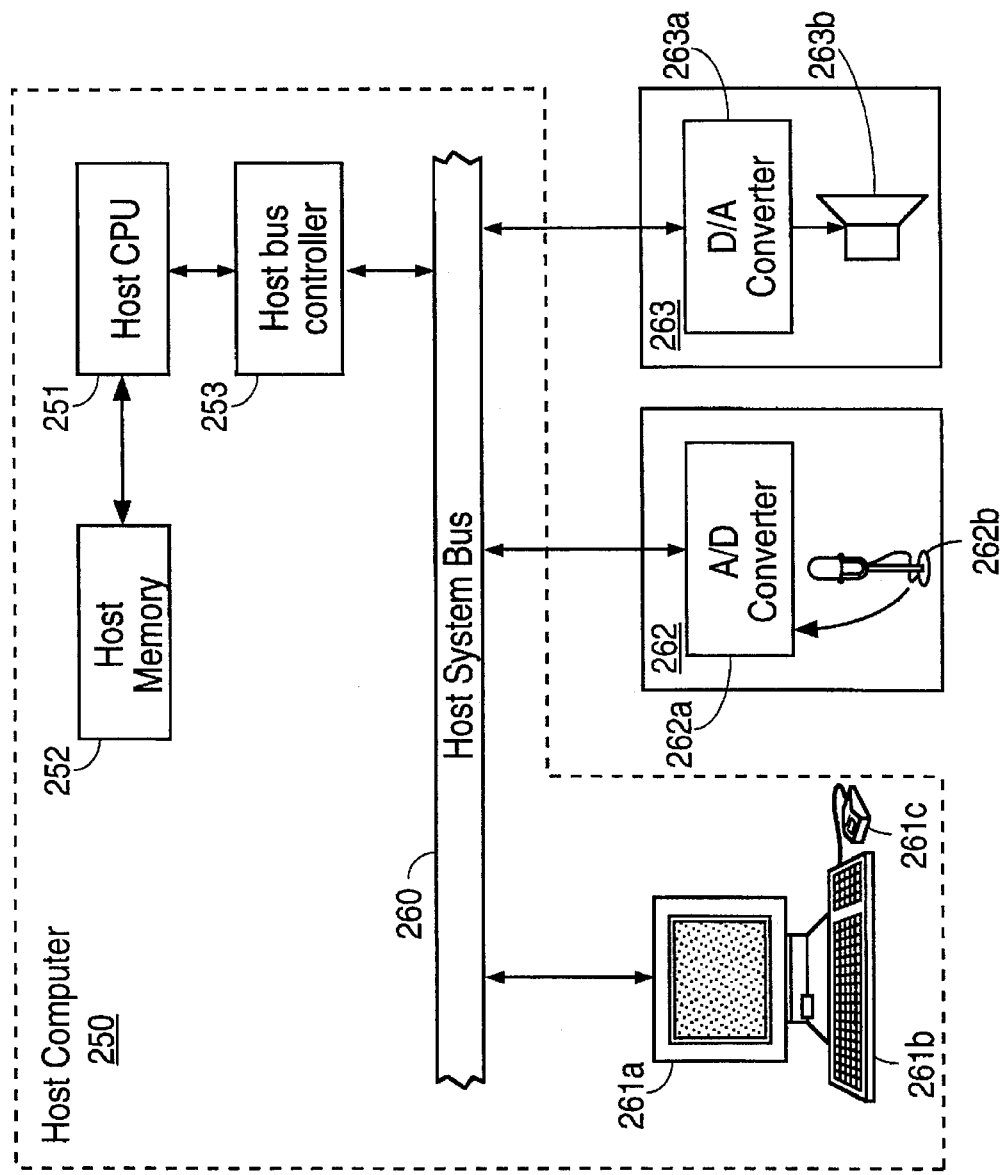
FIG. 2 illustrates a speech interpreter implemented in a general purpose host computer in accordance with the invention.

In accordance with one embodiment of the present invention as shown in FIG. 2, the speech interpreter is implemented in a general purpose host computer 250 which includes a central processing unit (CPU) 251, a host memory 252, a host bus controller 253, a host system bus 260, a monitor 261a, a keyboard 261b and a mouse 261c. An acoustic input device 262 having an analog-to-digital (A/D) converter 262a and a microphone 262b is coupled to system bus 260.

In this embodiment, computer 250 is also coupled to an acoustic output device 263 having a digital-to-analog converter (DAC) 263a and an audio speaker 263b. In some embodiments, the conversion of analog speech to and from digital form is accomplished remotely from host computer 250, for example, by coupling digital ISDN telephony lines to system bus 260 of host computer 250 via a conventional ISDN adapter (not shown).

(ii) General Description of the Speech Interpreter

Figure 3A:
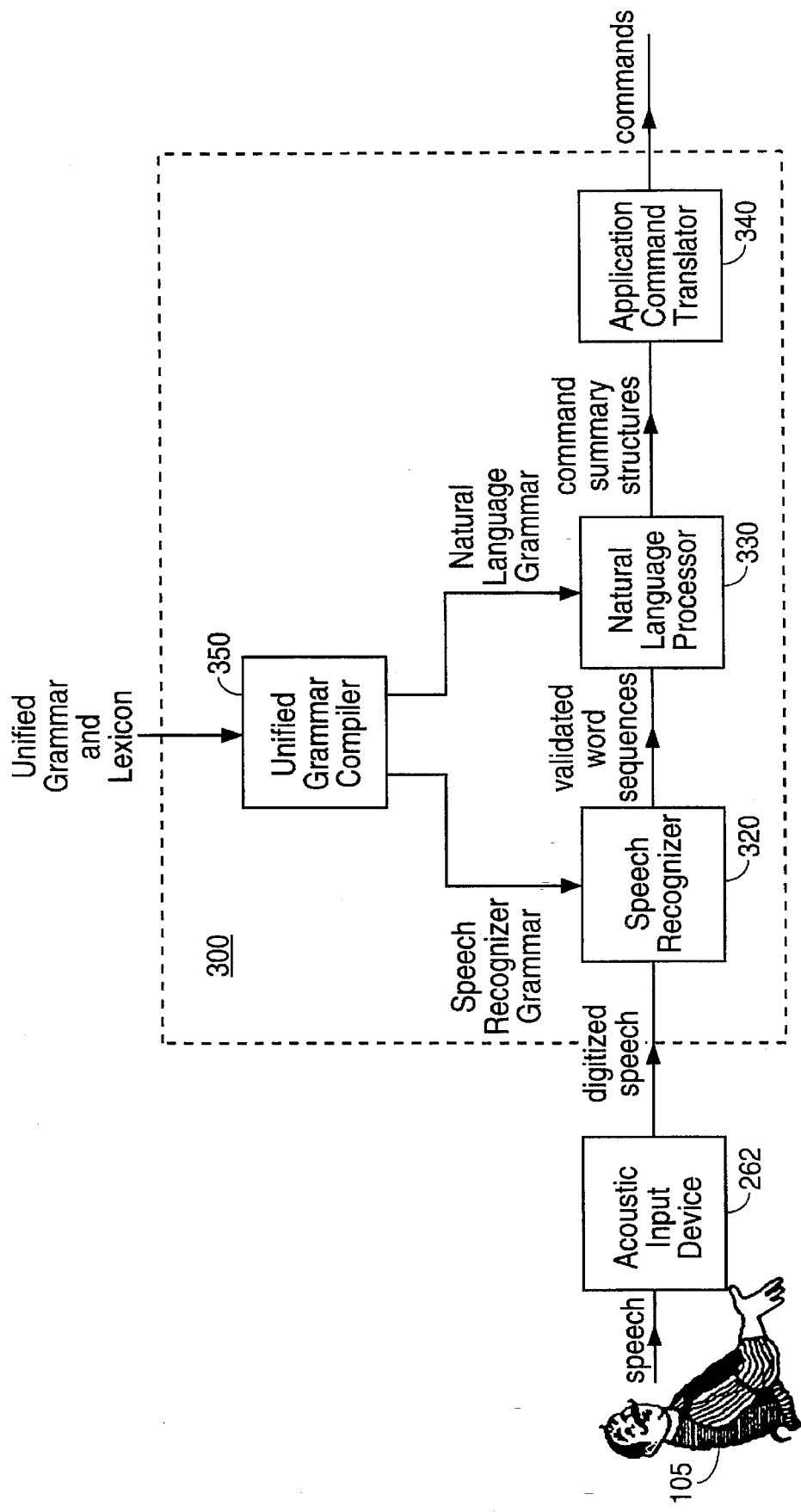
FIG. 3A is a block diagram showing the main components of the speech interpreter of FIG. 2.

In this embodiment, speech interpreter 300, illustrated by the block diagram of FIG. 3A, is loaded into host memory 252 of computer 250. Speech interpreter 300 includes a speech recognizer 320, a natural language (NL) processor 330, and an optional application command translator 340 coupled in series. Speech interpreter 300 is coupled to acoustic input device 262. A unified grammar (UG) compiler 350, also loaded into host memory 252, is coupled to both speech recognizer 320 and NL processor 330.

Other embodiments with variations in hardware system configuration are possible. For example, UG compiler 350 can be implemented in computer 250 for generating the SR and NL grammars, while the remaining portions of speech interpreter 300 (without UG compiler 350), such as speech recognizer 320 and NL processor 330, can be implemented in a different computer together with copies of the SR and NL grammars. It is also possible to accomplish the SR and NL processes on different computer systems.

Figure 4:
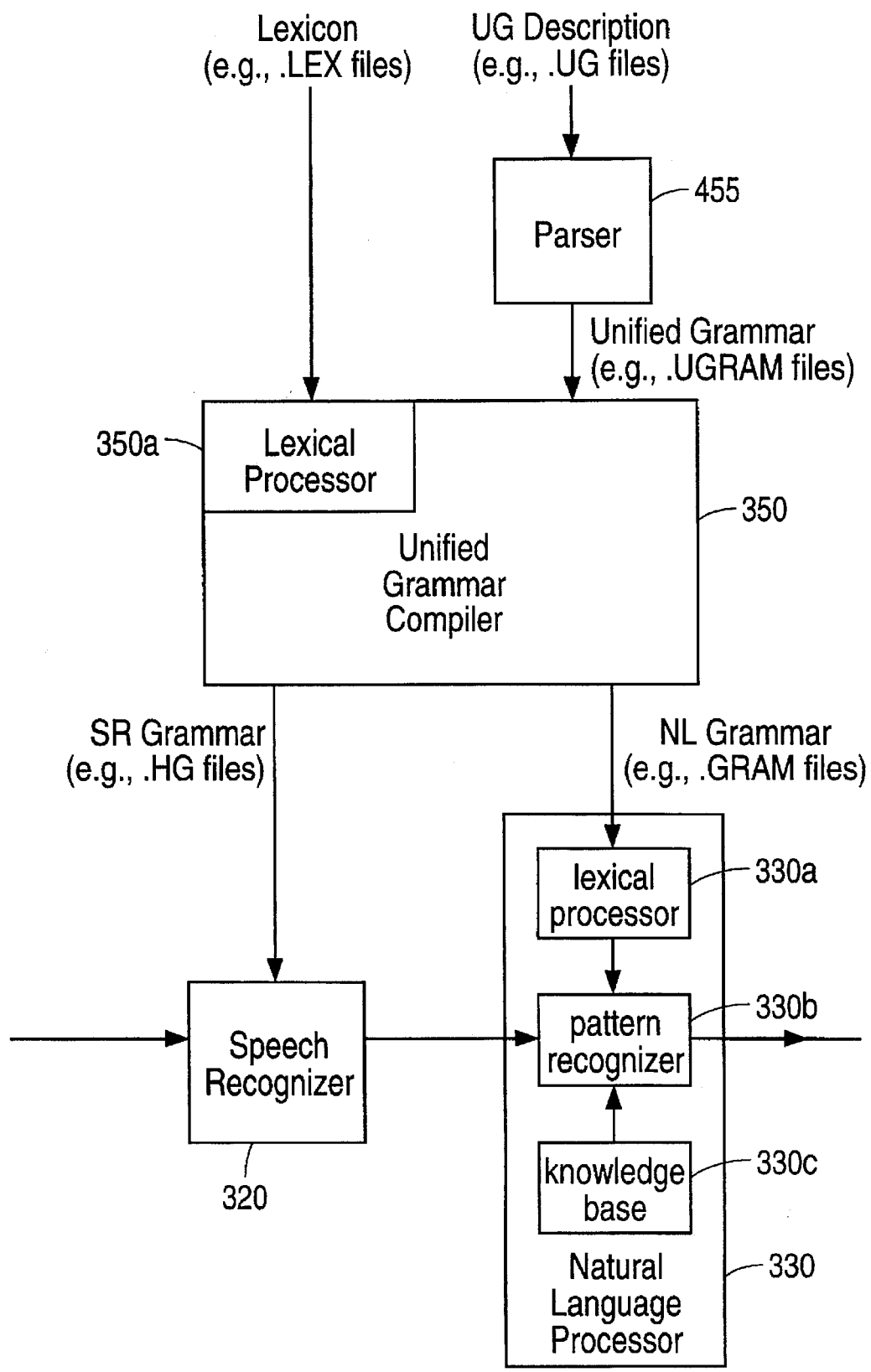
FIG. 4 is a block diagram showing the main components of the speech interpreter and the various inputs/outs between the components.

In accordance with this implementation of the invention as illustrated by FIG. 4, a parser 455, processes the unified grammar (UG) description (e.g., x.UG file) which includes UG rule restrictions corresponding to user applications such as calendar managers, email (electronic mail) systems and/or voice mail systems. Parser 455 generates a corresponding unified grammar (e.g., x.UGRAM file) in conventional LISP format for UG compiler 350. In order to enhance programming ease, maintainability, and portability, a separate supplementary UG lexicon (e.g., x.LEX file) defines characteristics, e.g., "meanings" of the words referenced.

For example, LOGIN.LEX, marks as "names, last" the words "adams", "baatz", "martin ", "sproull", "sutherland", and "yankelovich", and marks "names, first"on the words "bert", "bob", "eric", "nicole", "paul", and "stuart", thereby allowing reference by the unified grammar without requiring the unified grammar to include these words directly. The UG lexicon is received and processed by a lexical processor 350a of UG compiler 350. (Appendices A, B and C are listings of examples x.LEX, x. UG and x.UGRAM files, i.e., LOGIN. LEX, LOGIN.UG and LOGIN.UGRAM, respectively).

In turn, UG compiler 350 provides an SR grammar (e.g., x.HG file) for controlling speech recognizer 320 and an NL grammar (e.g., x.GRAM file) for controlling NL processor 330. (Appendices D and E are listings of example x.HG file and an x. GRAM files, respectively).

Figure 5A:
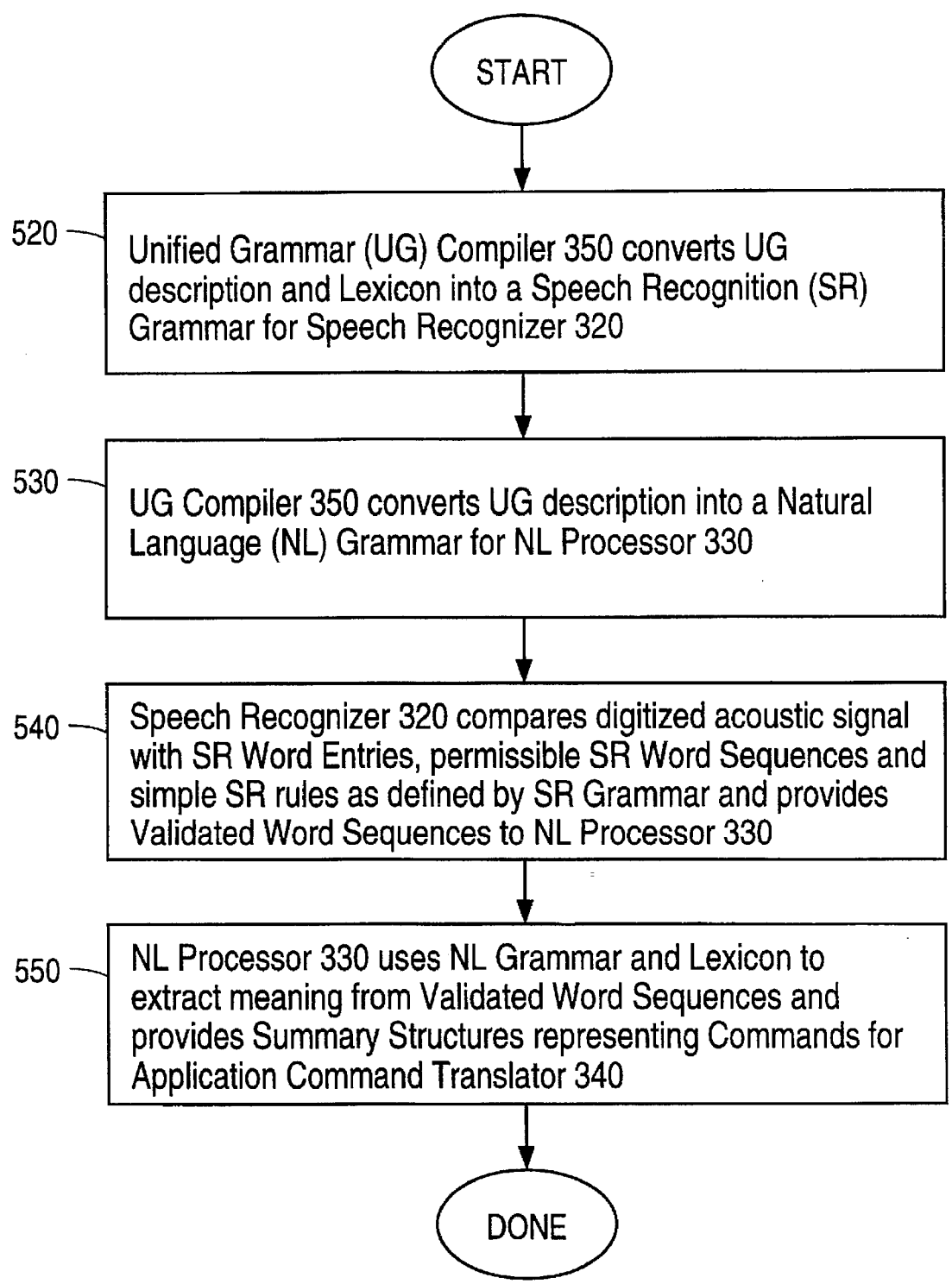
FIG. 5A is a low diagram illustrating the operation of the speech interpreter.

FIG. 5A is a flow diagram illustrating the operation of speech interpreter 300. Briefly, UG compiler 350 converts the UG description and the UG lexicon into the SR grammar for speech recognizer 320 (box 520) while UG compiler 350 converts the UG description and the UG lexicon into the NL grammar for NL processor 330 (box 530). Next, speech recognizer 320 compares digitized acoustic signal with the SR word entries, the permissible SR word sequences and the simple SR rules as defined by the SR grammar and provides validated word sequences to NL processor 330 (box 540). NL processor 330 then uses the NL grammar to extract the "meaning" from the validated word sequences and provides summary structures representing commands for application command translator 340 (box 550).

Figure 5B:
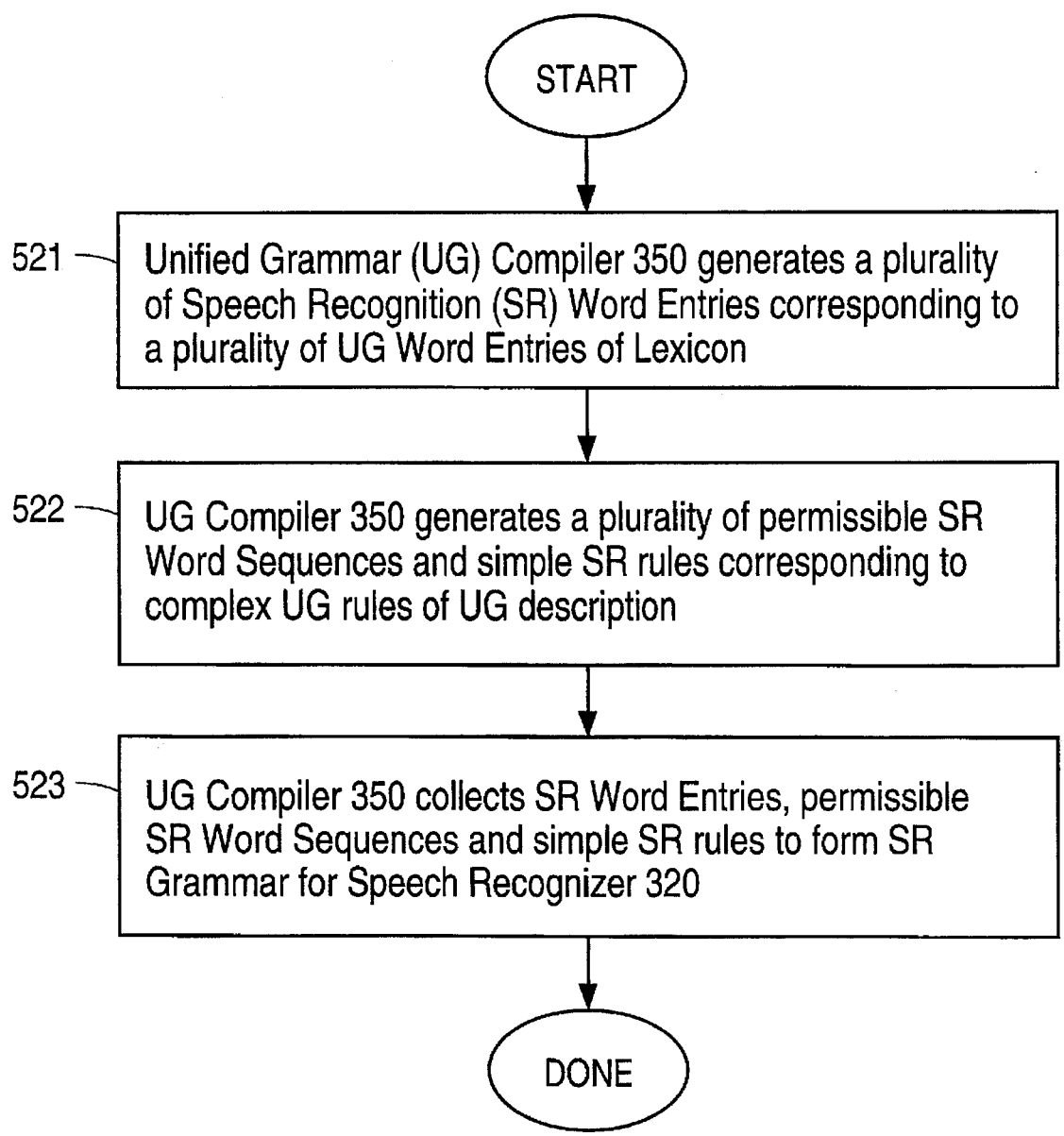
FIG. 5B is a flow diagram illustrating the generation of the SR grammar from the lexicon and the UG grammar.

FIG. 5B is a flow diagram illustrating the generation of the SR grammar from the UG lexicon and the UG grammar by UG compiler 350. First, UG compiler 350 generates a plurality of SR word entries corresponding to a plurality of UG word entries of lexicon (box 521). Next, UG compiler 350 generates a plurality of permissible SR word sequences and simple SR rules corresponding to the complex UG rules of the UG description (box 522). Finally, UG compiler 350 collects the SR word entries, permissible SR word sequences and the simple SR rules to form the SR grammar for speech recognizer 320.

As discussed above, the behavior of speech recognizer 320 and NL processor 330 is governed by the SR and NL grammars resulting from a compilation of the UG lexicon and the unified grammar by UG compiler 350. As such, a discussion of the syntax of the UG lexicon and UG description as implemented in this embodiment is useful for illustrating the functional principles utilized by both speech recognizer 320 and NL processor 330. (Appendix F is a user manual describing in greater detail the format of the UG lexicon and UG description.)

(iii) Syntax of the UG Lexicon

Depending on the user application, one or multiple UG lexicons are provided to UG compiler 350. For example, in the described embodiment, LOGIN.LEX contains the vocabulary for use during a user login process and CALENDAR.LEX contains the vocabulary with associated semantic information for a calendar manager.

Within the UG lexicon, each word entry has a number of features as shown in the format below:

```
(word
        ( (feature . value)
          (feature value1 value2 value3)    ;; Comment
        )
)
```

For example, a word entry for the word "mail" can be codified as:

```
(mail                          ;; The word being defined.
    ( (cat . n)                ;; The word sense is of category noun.
       (sem . application)     ;; Its semantic class is "application."
       (appl . email)          ;; The application is "email."
    )
    ( (cat . v)                ;; The sense is of category verb.
       (sem . move_data)
       (appl . send_mail)
    )
)
```

Features include pre-defined features such as a syntactic category ("cat") and a root form ("root") of the word entry. The word entry may also include other attributes needed for extracting the meaning of sentences which use the defined word, such as a semantic value ("sem") and a plural feature marking ("plural"). Features and their associated values provide a mechanism for associating a word entry with these attributes.

The pre-defined features, such as "cat" and "root", are distinguishable from other features in that they are present for all word entries. Where a word has multiple senses, e.g., "mail" can either be a verb or a noun, the definitions for each sense are clustered together within one word entry. In the specific example listed above, the word entry for "mail" has a first sense with a feature "cat" having a value "n" (noun) for defining the noun sense of the word, and a second sense with a different feature "cat" having a value "v" (verb) for defining the verb sense of the same word.

The pre-defined feature "root" of a word entry is normally set by lexical pprocessor 350a to the word itself except for words defined by morphological synthesis, i.e., when a word definition is derived from a definition of another word. In one such example, which involves defining the word "am" whose root is the infinitive form "be", by setting the feature "root", a mechanism is provided in the NL grammar for UG compiler 350 to forward the linkage information between "am" and "be" to NL processor 330. Conversely, for independently-defined words without linkage information, including irregular word forms that are defined as derivatives of their base word form, the feature "root" is generated internally by lexical processor 350a. Similarly, "word", another pre-defined feature, is generated internally by lexical processor 350a and need not be explicitly specified in the UG lexicon.

Another class of features are special features. For example, special feature "contractions-of" is used to define a sequence of words which are spoken as a single word (e.g., "didn't"), but which NL processor 330 treats as if it were a sequence of words (e.g., "did not"). Another special feature, an "irregular" feature, is for defining any derived word forms that do not follow the usual rules for the English language, e.g., irregularly formed past-tense, past-participle, ing-form, third person, and plural. For example, one way to properly process the syntax and extract the semantics of irregular verb "be" is to define the verb "am" as having irregular past-tense, past-participle, ing-form and third-person forms, i.e., "was", "been", "being" and "is", respectively.

When assigning semantic values to words, it is sometimes appropriate to associate a feature with a set of values instead of a single value. For example, a word entry for a first name "Bob" from a group of computer users names, "Bob Jones", "Bob Smith" and "Bob Doe", has a feature associated with multiple values, each value corresponding to a different last name. In this example, a "userid" feature of first name "Bob" is associated with multiple values corresponding to the application user identifiers (IDs) of "Jones", "Smith" and "Doe".

Note that the use of a UG lexicon, either as a single file or as a set of files, is merely a design choice and provided for programming convenience. Logically, all the information provided by a UG lexicon can be incorporated as additional rules in a UG description. The UG lexicon merely provides an efficient representation for each word thereby eliminating the need for a special-purpose rule for each word in the UG description. Hence, in other embodiments, the UG lexicon is included within an extended UG description.

(iv) Syntax of the Unified Grammar (UG) Description

In this embodiment, a UG description includes a set of UG rules associated with word entries corresponding to words recognizable by speech recognizer 320. These UG rules include Backus-Naur Form (BNF) definitions and supplementary "augmentations" which constrain the BNF definitions and/or specify how the word entries (of the lexicon) and the UG rules are processed by NL processor 330. Augmentations include "local declarations", "tests", and "actions". Note that the UG rules and their augmentations of the UG description refer to the words defined by the corresponding UG lexicon(s) and to other UG rules.

Anatomy of a UG Rule

```
{ruleName/tag := pattern;
    local declaration; # Comment.
    test;
    assignments;
}
```

Note:
Local declarations, test, and assignments are collectively called augmentations.

For example, a UG rule for a login sentence can be codified as:

```
{loginSentence/application := sem=application ["please"];
    head application;                    # A declaration.
    application.confirm = t;             # A test.
    object := application.appl;          # An assignment.
    action := 'switch;                   # Another assignment.
}
```

A UG description (input file) begins with optional global declarations for setting parameters that apply to all the UG rules. The global declarations are simply passed by UG compiler 350 into an internal declaration file (e.g., X.DECLS) for controlling the operations of speech recognizer 320 and NL processor 330.

Each UG rule includes the following elements: a rule name, a BNF definition of a UG pattern, and an optional set of local declarations, tests, and actions. As discussed above, collectively, the set of local declaration, tests, and actions are known as augmentations. Note that UG rules with augmentations are called complex rules while UG rules without augmentations are called simple rules.

Local declarations can included "bias" and "region" (for SR grammar) declarations, "head" declarations for NL grammar and "pass" declarations for NL processor 330. The optional "bias" declaration predicts the likelihood, relative to the other alternative versions, that a particular word sequence corresponding to the version so marked of a UG role will be recognized by speech recognizer 320. A "region" declaration marks a UG rule so that the UG rule can be selectively turned on and off by speech recognizer 320 when using the respective SR grammars. In some implementations, speech recognizer 320 is not capable of supporting bias and/or regions and so the bias and/or regions declarations are simply ignored.

A UG pattern is the right-hand-side (RHS) of a UG rule and is subsequently used by NL processor 330 for a comparison with the input sequences of words and other UG patterns that have already been matched. Words designated by any combination of the predefined features (cat, sem, root, or word) and any previously defined UG patterns can be used to compose each UG pattern. The standard operators of extended BNF are also supported, so that optional rule components (including various kinds of optionality) and alternative choices can be easily defined in the UG pattern. Optional rule components that are either present once or absent within a UG pattern are indicated by surrounding them in square brackets. Alternative rule components, i.e., where one of the choices must be present, are listed separated by a "|" (vertical bar) symbol. For example, a UG rule for defining a sentence which includes the word "help", is preceded optionally by either "please" or "can you", and optionally followed by "me" can be codified as:

{loginSentence/help:=["please"|("can" "you")]"help"["me"];}

In addition, a Kleene Plus ("+") symbol following a UG pattern element indicates one or more occurrences of an element, while a Kleene Star ("*") symbol indicates zero or more occurrences of an element. Hence,"please"+matches "please" and "please please please", while (["pretty"] "please")* matches "please please" "pretty please", "please" and also matches the case of no occurrence of "please" at all. Any element of a UG rule definition can also be labeled with a tag to allow unambignous reference to that portion by various augmentations; these tags appear after a slash symbol ("/") in the UG rule definitions.

When an arbitrarily large number of matches are permitted due to the use of Kleene Plus or Star in a UG pattern, the use of the value of such a pattern takes on a different function than for patterns that match only one element or none at all. UG compiler 350 accommodates the complexity by allowing a reference to the most recent UG pattern matched by the Kleene operator, by simply using the normal name of the pattern (or any tag associated with the pattern). An augmentation can access the exhaustive list of all the matches by using the pattern name (or an associated tag) and appending an asterisk "*" to it. Subsequently, any test or assignment using the starred name is compiled into a loop that accesses each of the matched patterns in the order they were previously matched.

Tags

As with rule names, individual elements in a pattern can be tagged thereby providing another way to reference alternative elements within a pattern. Hence, just as predefined features in a rule (e.g., sem=application) permit references to a set of words in the lexicon, tags permit references to a set of elements in a rule. One tagged example is shown below:

```
{nameSent:=(("I"/pn "am")|("my"/pn"name" "is")) sem=firstname;}
```

The tag "pn" (for pronoun) can now be referred to by an augmentation for extracting the feature-value pairs associated with whichever word is eventually recognized, thereby eliminating the need for two separate augmentations. Tags are also used to differentiate otherwise identical elements in a pattern. For example, in the login program, the user might be asked to speak a three digit password. Such a rule may look like:

```
{password:=cat=number cat=number cat=number: }
```

In order to be able to refer to each specific number separately (perhaps to extract the numeric value of each number), the following tags are used:

```
{password:=cat=number/num1 cat=number/num2 cat=number/num3:}
```

In subsequent augmentations of the rule, separate references to "num1,", "num2,"or "num3" are permissible.

In a pattern, a tag may only be applied to a single resulting element. For example, in the pattern below, the tag "title" will eventually be attached to either "professor" or to "doctor", whichever one is eventually matched:

```
{userName:=("professor"|"doctor")/title sem=lastname;}
```

Head

It is also possible to use the unified grammar to transfer features and other information to the user application, in addition to the words from speech recognizer 320. Generally, most of these features come from a single, most important dement in a pattern. Linguists refer to this element as the "head" of the rule.

The head declaration is one mechanism for passing "up" feature information for later use. A single element of the pattern may be chosen as the head of the rule. Typically the head element has the most features associated with it that need to be transferred to the user application. For example, in the name sentence rule example described below, "firstname" may be declared as the head as indicated below:

```
{nameSent := (("I" "am") | ("my" "name" "is")) sem=firstname;
    head firstname;
}
```

Note that the "I am" and "my name is " phrases do not contribute substantially to the meaning of the sentence, since the name is the most significant part of the sentence.

For example, suppose UG lexicon contains the following entries:

```
(bob    ( (cat . proper_noun) (sem . firstname) (userid . rjones) ) )
(is     (  (cat . v)   (root . be) . . .)
(my     (  (cat . pronoun) (sem . owner) ) )
(name   (  (cat . n) ) )
```

Also suppose that the unified grammar includes a top level statement:

```
{top-level := nameSent;
}
```

By running the sentence "My name is Bob" through speech interpreter 300 of this embodiment, the following output list of feature-value pairs results:

cat: proper_noun sem: firstname userid: rjones heads: (nameSent firstname)

Notice that only the features and values associated with "Bob " are propagated through to the user application. This is because the features associated with the head of nameSent are propagated to the top-level statement, and the features associated with the top-level statement are output by NL processor 330. (See also the section below entitled "Assignments" for propagating features other than those associated with the head element.)

In certain word sequences, there is no information requiring transfer to the user application. For example, politeness phrases at the beginning or end of a sentence, which do not add any meaning to the sentence. The "nohead" declaration explicitly declares that no features from the rule are to be propagated as indicated below:

```
{top-level := loginSentence [politePhrase];
    head loginSentence;
}
. . .
{politePhrase := (["if" "you"] "please") | "thanks";
    nohead
}
```

If the pattern of a rule has only a single element, then it is not necessary to declare the head. The head is assumed to be that element. Similarly, if the pattern is recursive (that is, the rule name appears in the rule's pattern) then the head is assumed to be the recursive element. In ambiguous cases it is desirable to include a head or no head declaration because if the pattern contains multiple elements and there is no head declaration, a nohead declaration will be assumed and no features will be propagated from the rule.

Recursive Nesting

In this embodiment, the UG description also supports simple nesting and recursive nesting of NL pattern s. Hence, any UG rule can be referred to by a UG pattern which defines other UG rules. The following example on Preambles and Names illustrates this capability:

{Preamble:="I" "am";}

{myPreamble:="my" "name" "is";}

Continuing with this example and defining a set of name rules such as:

{userName/full:=sem=firstname [sem=lastname];}

{userName/title:=["professor"l"doctor"]sem=lastname;}

Referring now to a userName in another UG rule:

{nameSent:=(lPreamblelmyPreamble)/preamble userName;}

This combined use of the above UG rules results in the following valid sentences:

I am Bob

My name is Bob

I am Bob Jones

My name is Professor Jones

The use of recursively defined UG rules results in flexible UG rules suitable for defining arbitrary sequences of repetitive word occurrences without explicitly enumerating each and every combination.

In some embodiments, recursive nesting is not supported by the required formalism of the SR grammar for a specific speech recognizer. In these cases, UG compiler 350 expands any recursion required by a UG grammar into a set of explicitly defined UG rules covering the individual cases. Although recursive definitions theoretically allow an infinite repetition of certain elements, the expansion as implemented is limited by a global declaration.

Tests

A test is a way to constrain a rule beyond what is possible in a pattern. Since only the four pre-defined features (cat, sem word, and root) can be used directly in a pattern, a test is a way to check for user-defined features or for more than a single pre-defined feature.

It is sometimes necessary to test for more than a single pre-defined feature of a word, especially words with senses that depend on its usage in different parts of speech. For example, words that refer to applications names (e.g., mail, login) may also have verb senses. Hence, to ensure a match of the correct sense of the word, a test for two pre-defined features can be implemented by including one feature in the pattern and the other in a test:

```
{applSentence :=["switch" "to"] sem=application [politePhrase];
   head application;
   application.cat = 'n;
}
```

In the example above, the test (application.cat='n) is translated as "the value of the cat feature of the word that matches the pattern sem=application is a noun." Note that literal values are preceded by a single quote mark where they appear in an augmentation.

Any time a pattern contains a pre-defined feature (as in sem=application), a reference to this part of the pattern in any test or assignment augmentation can be made by using the name that comes after the equal sign (e.g., "application"). A dot syntax is then used to refer to any feature of that element. For example, "application.cat" refers to the cat feature of the word that matches the pattern "sem=application". This could be the cat feature of "mail," "calendar," "rolodex," etc.

In addition to testing for the value of a feature, it is also possible to test if a feature exists at all. For example, a rule allows sequences such as "the first application," "the second program," or "the third one." The rule, which optionally allows for the word "the" followed by a number, followed by an object (defined in another rule to be synonyms for the word "application") may contain a test to restrict the number to be an ordinal as indicated below:

```
{phrase := ["the"] cat=number object;
   head object;
   number. cardinal = nil;
}
```

The above-described test is possible because, as shown in the example UG lexicon, numbers are defined so that cardinal numbers (one, two three, etc.) have the cardinal property set to "true":

```
(five
  (   (cat . number
      (numval . 5)
      (cardinal . t)
  )
)
```

Ordinal numbers (first, second third, etc.) had no cardinal feature defined. Hence, in order to use only ordinal numbers in pattern, a check is conducted to ensure that the cardinal property is not set to "true". Such a test can be done using a special value "nil." The same test can also be accomplished using the not equal (!=) test operator as indicated below:

```
{phrase := ["the"] cat=number object;
   head object;
   number.cardinal != t;
}
```

In the UG lexicon, it is also possible to assign a set of values to a feature rather than a single value. For example, the login application might have to handle a large number of users having the same first name. One example of entries for first names in the UG lexicon is as follows:

```
(bob
   (   (cat . proper_noun)
              (sem . firstname)
              (userid bsmith rjones bmcbride)
       )
   )
(jones
       (   (cat . proper_noun)
              (sem . lastname)
              (userid ajones bjones kjones rjones tjones)
       )
   )
```

In the user application, a rule that accepts first names followed by last names can be codified as:

{userName/full:=sem=firstname sem=lastname;}

To assure that this rule does not match any arbitrary combination of first and last names, you can add a test to check to see if there is an intersection of userid values of the first name and the last name.

For example:

```
{userName/full := sem firstname sem=lastname;
    head firstname;
    firstname.userid ~= lastname.userid;
}
```

The set intersection operator (~=) is used to check for matching field values. In this example, the name "Bob Jones" would match this pattern because the value "rjones" is associated with both the first name and the last name userid features. The name "Tom Jones" would not match the pattern given this lexical entry for "Tom":

```
(tom
(   (cat. proper_noun)
        (sem.firstname)
        (userid tsmith tpeters)
    )
)
```

In sum, the "test" augmentation constrains a UG rule beyond what can be accomplished by a BNF definition of a UG pattern, i.e., the "test" augmentation provides a mechanism for expressing any additional constraints beyond the limited set of constraints that can be defined in a UG pattern. For example, in a UG rule for testing a word having more than one feature, one of the features (which is an explicit value required of one of the predefined features) is included within the UG pattern while the remaining feature(s) are included as test augmentation(s) of the UG rule. Similarly, where the pattern contains the rule name, a test augmentation allows additional tests of the feature of that instance of a previous application of the named rule. Hence, in a more specific example, when "cat=n" appears in a UG rule, UG compiler 350 interprets a test augmentation such as "n.sem= 'application;" to mean the word must be a noun (from the UG rule reference to a category) and its semantic category must "application".

Finally, any test augmentation which is too complex to be expressed using the normal declarative constraints language of the UG description can be expressed as a predicate written in Lisp. For example, a rule for a number that is a teen can be implemented as a Lisp test:

```
{teen := cat=number;
        lispp (and (<12 (get-v-p number numval))
                   (>20 (get-v-q number numval)));
}
```

Note that in the above example, the Lisp expression is "true" if and only if the value of the number falls in the range between thirteen and nineteen.

Assignments

Assignments provides a mechanism for supplementing the feature-value pairs that are copied by head declarations.

Recall the following example:

```
{nameSent := ( ("I"/pn "am") | ("my"/pn "name" "is") )
    sem=firstname;
    head firstname;
}
```

Here, all the feature and values associated with the word that matched the pattern sem=firstname are propagated up to the feature-value set for "top level" nameSent. Suppose it is desirable to provide user application with different feedback depending on which preamble phrase is used. In this case, there is a need to pass up information to the user application about which pronoun ("I" or "my") was received. The following is an example of an assignment statement to associate this additional information with the head:

```
{nameSent := (("I"/pn "am") |("my"/pn "name" "is")) sem=firstname;
    head firstname;
        pronoun := pn.word;
}
```

In this assignment, a new feature called "pronoun" has been created. Its value will be either "I" or "my" (pn.word means the word feature of the element with the pn tag). Hence, if speaker 105 says "My name is Bob," the resulting feature-value list from NL processor 330 would look like:

cat: proper_noun sem firstname userid: rjones pronoun: my heads: (nameSent firstname)

The use of assignments can either create new feature-value pairs or rewrite the value of a feature that had already been set by an earlier assignment or by a head definition. Assignments are used wherever there is a need to propagate additional information to the user application. In this embodiment, additional information required for a change of application, e.g. from email to calendar manager, includes a new feature "command" along with all the features associated with the word "calendar". Occasionally, it is desirable to have an assignment conditional, depending on whether there is not already an existing feature-value pair, i.e., the assignment will not overwrite a previously set value. In the unified grammar, the conditional assignment is called a "soft assignment" operation, expressed by the soft assignment operator, ".=". For example:

USERID .='implicit;

(v) Conversion of the UG Description into a Unified Grammar

Having described the syntax of the various input files i.e., the UG lexicon and UG description, the operation of the various components of UG-based speech interpreter 300 is described now in detail. FIG. 3A and 4 are block diagrams of speech interpreter 300. FIG. 5 is a high level flow chart illustrating an initialization sequence of UG based speech interpreter 300. As discussed above, UG compiler 350 is responsible for producing the output files, i.e., the SR and NL grammars, required by speech recognizer 320 and NL processor 330 to complete their respective initialization sequences.

Parser 455 receives UG rule definitions in a UG description, converts these definitions into LISP format and outputs these definitions as a unified grammar to UG compiler 350. This transformation is limited to syntactic changes, i.e., the meaning of these UG rule definitions remains unaltered. Depending on the user application, one or more UG descriptions are parsed independently in any order. The resulting unified grammar is provided to UG compiler 350 which constructs an internal SR grammar finite state structure based on the defined UG rules. UG compiler 350 modifies the BNF definitions and augmentations into a format required by NL processor 330.

(vi) Compilation of the Lexicon and Unified Grammar to Produce an SR Grammar

In this embodiment, since the SR grammar required by speech recognizer 320 cannot contain augmentations or make any use of features from lexicons, the steps described below are required to create a suitable augmentation-free SR grammar.

First, UG compiler 350 loads the UG lexicon containing the UG word entries and generates morphological extensions to produce the full internal form of the word entries. UG compiler 350 then uses unified grammar rules and the internal word entries to generate a portion of an SR grammar for speech recognizer 320.

In order to eliminate the need for defining every form of each word in the UG lexicon, when lexical processor 350a generates a (primary) permissible word for the SR grammar, lexical processor 350a also generates the appropriate derivative forms for various categories of permissible word, e.g., nouns, adjectives, and verbs. For example, a plural form is synthesized for all nouns (e.g., messages, names), and two forms of adjectives are generated, i.e., comparative (e.g., colder, bigger) and superlative (e.g., coldest, biggest). In addition, there are four derived alternative forms for each verb, i.e., the simple past tense (e.g., I counted), past participle (e.g., I have counted), present participle or "ing" form (e.g., I am counting), and third person singular (e.g., He counts). Note that the special feature "irregular" described above is used to control the expansion resulting from the generation of derivative forms, i.e., avoid erroneous derivative forms.

In contrast, special features, once compiled, are not included in the SR grammar outputted to speech recognizer 320. Instead, special features, such as "contractions-of", cause lexical processor 350a to produce word entries which require special handling.

Words having a "contractions-of" feature require special handling because they cannot be treated as a single word for syntactic and semantic analysis since each of their component "words" is probably a different part of speech. Hence, by defining a sequence of individual words which makes up the contraction, the "contraction-of" feature enables UG compiler 350 to construct and substitute an expanded form of the contracted speech in the NL grammar, and to use rules based on the expanded form yet, sounds based on the contracted form in the SR grammar. For example, "didn't" is defined as a contraction-of "did not", enabling "didn't" to be heard as one word but subsequently processed as if it were two words.

Next, UG compiler 350 constructs an internal SR grammar finite state structure based on the defined UG rules provided via the unified grammar. UG compiler 350 produces an equivalent of each UG rule by defining an SR rule in the SR grammar, with each SR rule assigned a rule name. The rule name is derived from the UG rule and is either unique or else has a unique tag associated with the name such that the name and tag together form a unique rule identifier. The unique rule name or tag identifies each rule sharing the name with the alternative patterns of the UG rule for ease of writing and debugging the UG rules.

UG compiler 350 generates an SR grammar by identifying each main rules of the UG grammar to be compiled and processing each portion of each UG rule in turn. Each portion of each UG rule causes the generation of a corresponding SR rule in the resulting SR grammar, with the SR rule having as many permissible words or sequences as possible corresponding to the test augmentations of each portion. In other words, UG rules with augmentations are expanded into alternative rules within each main SR rule, for each possible outcome of the augmentation test. In turn, if the alternative rules depend on other tests, they are expanded until it is possible to represent every UG rule with a main SR rule (without augmentations) having a set of BNF definitions referring ultimately to corresponding permissible words or sequences. This process of converting complex UG rules (with augmentations) into simple SR rules (without augmentations) is called the "lexicalization" of the UG rules, i.e. the UG grammar is converted into a form that depends only other simple rules and on the lexicon (in the expanded internal form).

When a corresponding simple (SR) rule will be too permissive, UG compiler 350 converts that rule into a disjunction of permissible word sequences, i.e., the SR rule corresponds to at least two permissible (i.e., grammatically allowable) word sequences defined by one of the complex UG rules. For example, in a login sequence for a user application, a list of permissible user full names is limited to "Bob Jones", "Jane Smith", "Jane Jones" and "Pete Baker". The UG grammar rule for such an application defining the alternative full names can be codified as:

```
{fullname := firstname lastname;
    head firstname;
    firstname.userid ~= lastname.userid;
}
```

```
(Bob
        ( (sem . firstname)
            (userid bobjones)
        )
)
(Jane
        ( (sem . firstname)
            (userid janesmith janejones)
        )
)
(Pete
        ( (sem . firstname)
            (userid petebaker)
        )
)
(Jones
        ( (sem . lastname)
            (userid bobjones janejones)
        )
)
(Smith
        ( (sem . lastname)
            (userid janesmith)
```

-continued

```
            )
        )
    (Baker
            ( (sem . lastname)
                (userid petebaker)
            )
        )
```

Using the above UG rule, UG compiler 350 compares the user IDs associated with the respective first and last names and produces the following definitions for "$fullname" in the SR grammar below:

```
$fullname:    ( $firstname_eq_userid_bobjones $lastname_eq_userid_bobjones |
              $firstname_eq_userid_janesmith $lastname_eq_userid_janesmith |
              $firstname_eq_userid_janejones $lastname_eq_userid_janejones |
              $firstname_eq_userid_petebaker $lastname_eq_userid_petebaker );
$firstname_eq_userid_bobjones : Bob;
$lastname_eq_userid_bobjones : Jones;
$firstname_eq_userid_janesmith : Jane;
$lastname_eq_userid_janesmith : Smith;
$firstname_eq_userid_janejones : Jane;
$lastname_eq_userid_janejones : Jones;
$firstname_eq_userid_petebaker : Pete;
$lastname_eq_userid_petebaker : Baker;
$firstname : ( Bob | Jane | Pete )
$lastname : ( Jones | Smith | Baker )
```

Subsequently, an SR simple role can refer to "$fullname".

Figure 6:
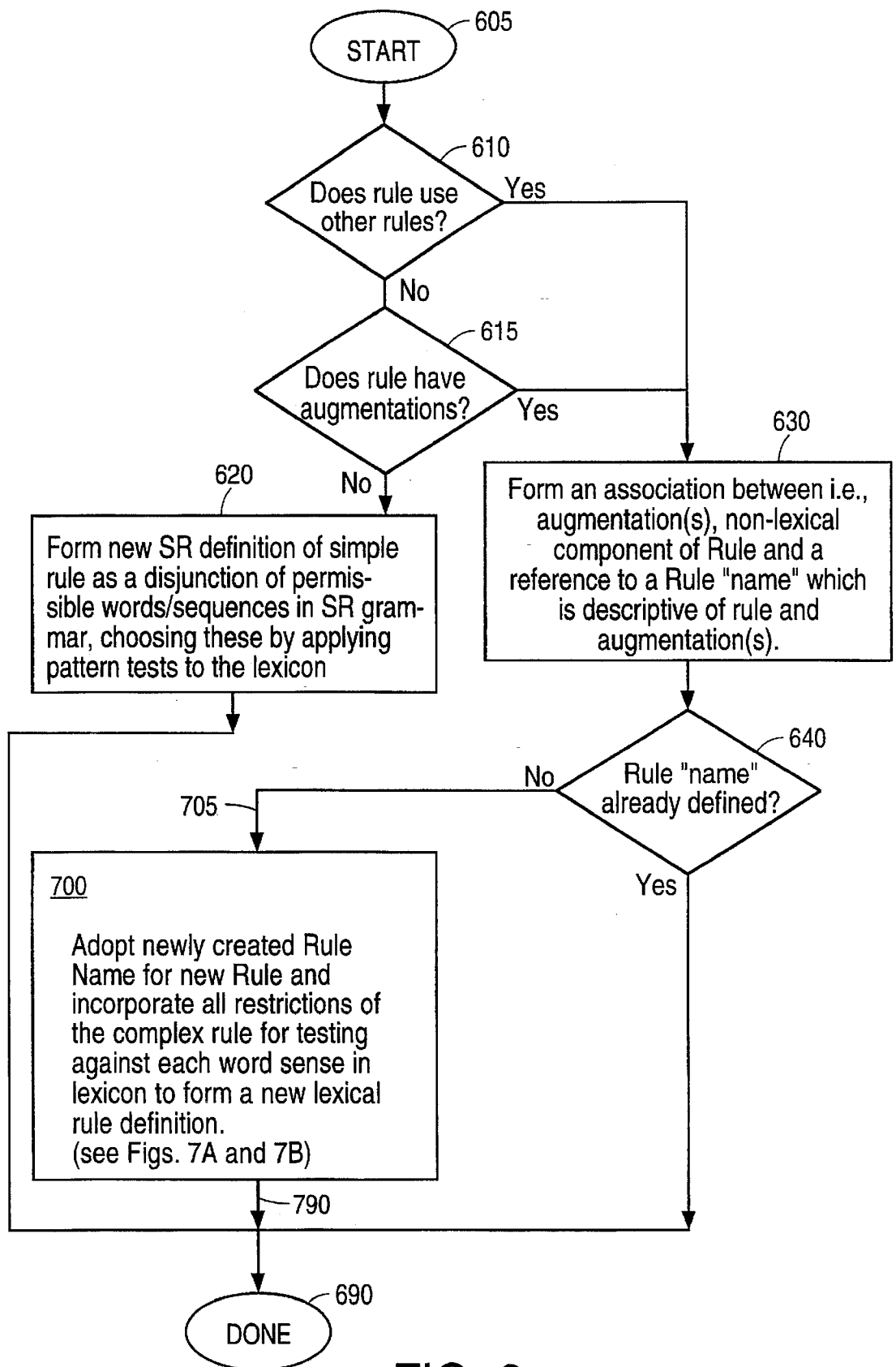
FIG. 6 illustrates a flow chart illustrating a method for converting a main UG rule into SR rules.

FIG. 6 is a flow chart illustrating a method used by UG compiler 350 for converting a main UG rule into SR rules. Once every portion of each UG main rule has been lexicalized or rewritten as simple rules representing the test augmentations, a new SR grammar definition is created for the SR grammar which defines each main SR rule as a disjunction of its component rules (box 620). The disjunction permits a choice between all the simple rule definitions derived from the main UG rule.

If a rule name (e.g. "email") is defined in a rule pattern, but there are additional tests (e.g. "email.cat=v") applied to the name in the rule, i.e. it is not purely lexical, an association is formed between the non-lexical rule component(s) and a rule name which is descriptive of the original rule component and the application of all the test augmentations (box 630). Next, UG compiler 350 checks for an existing rule in the SR grammar with an identical rule name. If an SR rule having an identical name exists, then the "new" rule has already been defined in the SR grammar and no further processing is required. On the other hand, if the rule name has not been previously defined, then all rule restrictions are incorporated into the new rule, and used in testing against each word in the UG lexicon to generate a lexicalized definition of the new SR rule in the SR grammar (box 700). If the rule components include references to other rules (instead of just words), then the lexicalizing process involves lexicalizing the referenced rules as well.

Figure 7A:
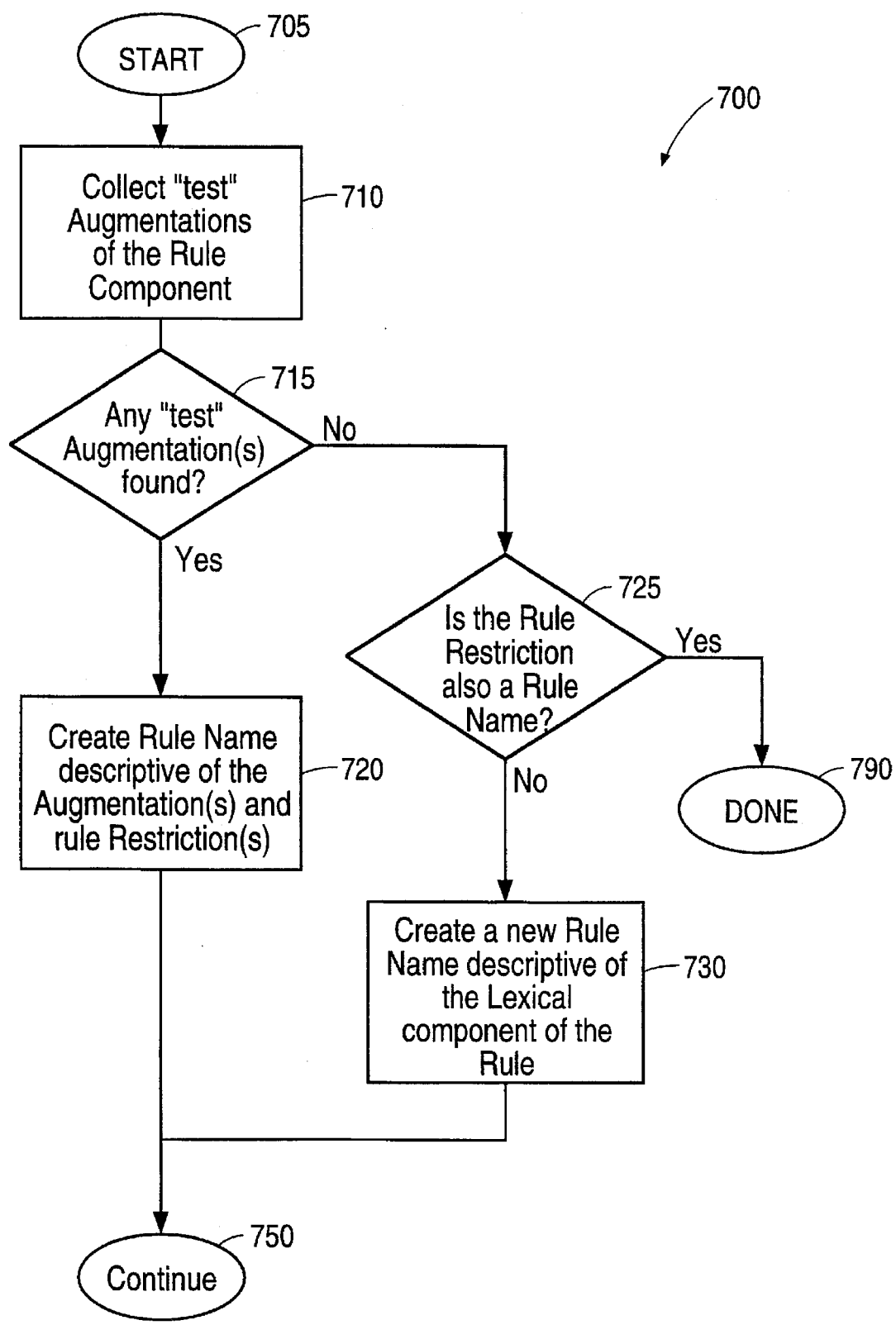
FIG. 7A and 7B are flowcharts illustrating a method for lexicalizing a portion of the main UG rule for generating the SR grammar.
Figure 7B:
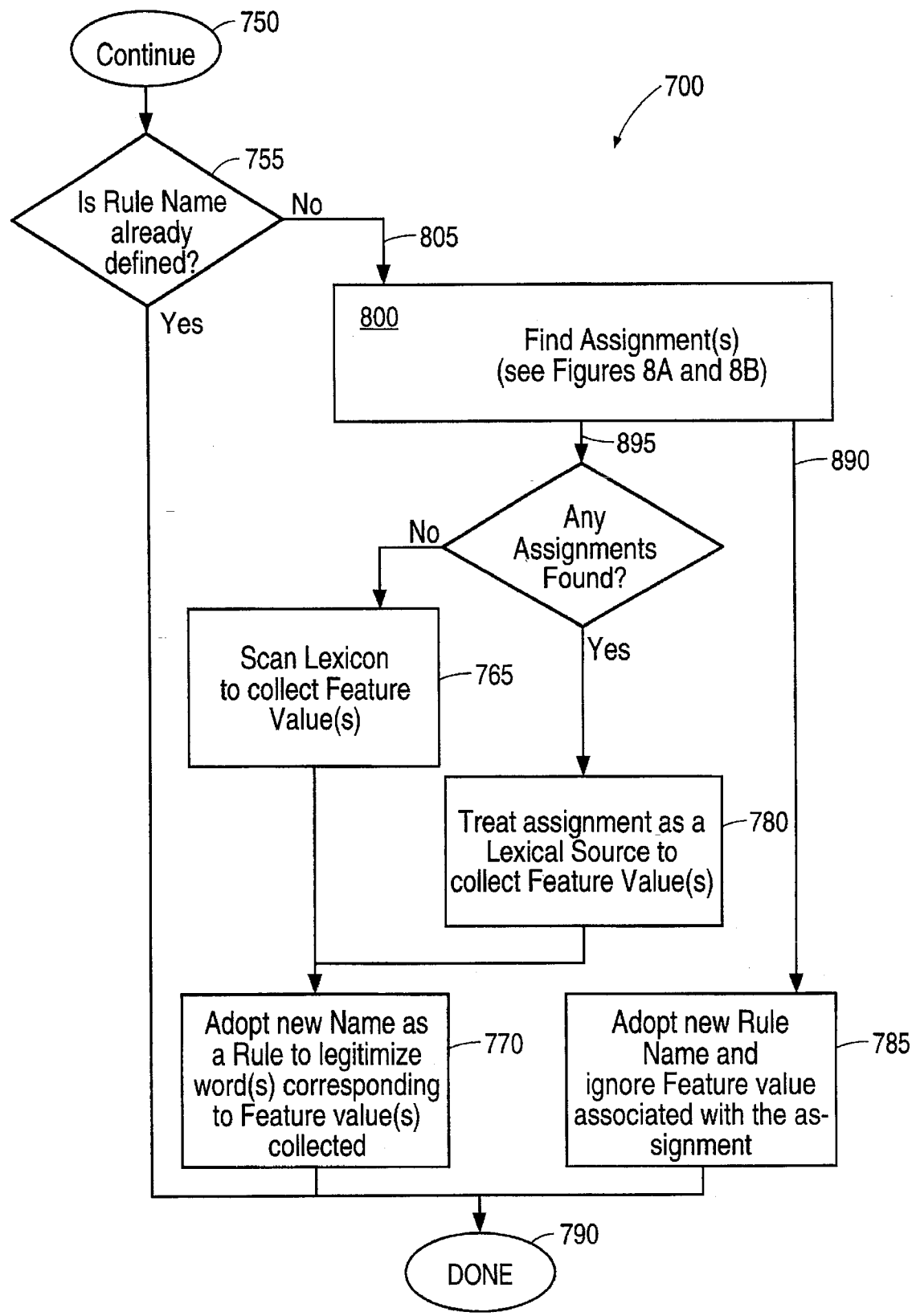

FIGS. 7A and 7B, are flowcharts illustrating a method 700 used by UG compiler 350 for lexicalizing a portion (derived originally from a UG rule definition) of a main UG rule while generating the SR grammar. To compile a rule component, the UG compiler 350 begins by collecting all the augmentations associated with the particular rule component that appear in the pattern of the UG rule in the unified grammar (box 710). If one or more augmentations are located, a new rule name is created based on the augmentation(s) (box 720).

If no augmentation is found, no processing is necessary for this portion of the pattern. Conversely, if no augmentation is found and the rule restriction does not refer to an existing rule name, i.e., the UG rule restriction refers to a feature instead, a new proposed rule name is created based upon a description of the rule restriction, and the new rule is defined as the collection of words or word sequences that satisfy the restriction (box 730).

Next, UG compiler 350 checks the portion of the SR grammar under construction for an existing simple rule with an identical name (box 755). If the rule name already exists, no further processing is required for this rule component. However, if the rule has not already been defined and if the feature value is derived from the UG lexicon, then the definition is done as previously described to determine whether a feature is not merely copied up from the lexicon but is possibly assigned by "action" augmentations (assignments) of any rule, the UG compiler 350 initiates a search for assignments, including both declarative and Lisp implemented actions within the complete set of partial definitions of the rule, and also in any rules that pass values upward to the other components of the pattern of this rule (box 800).

Figure 8A:
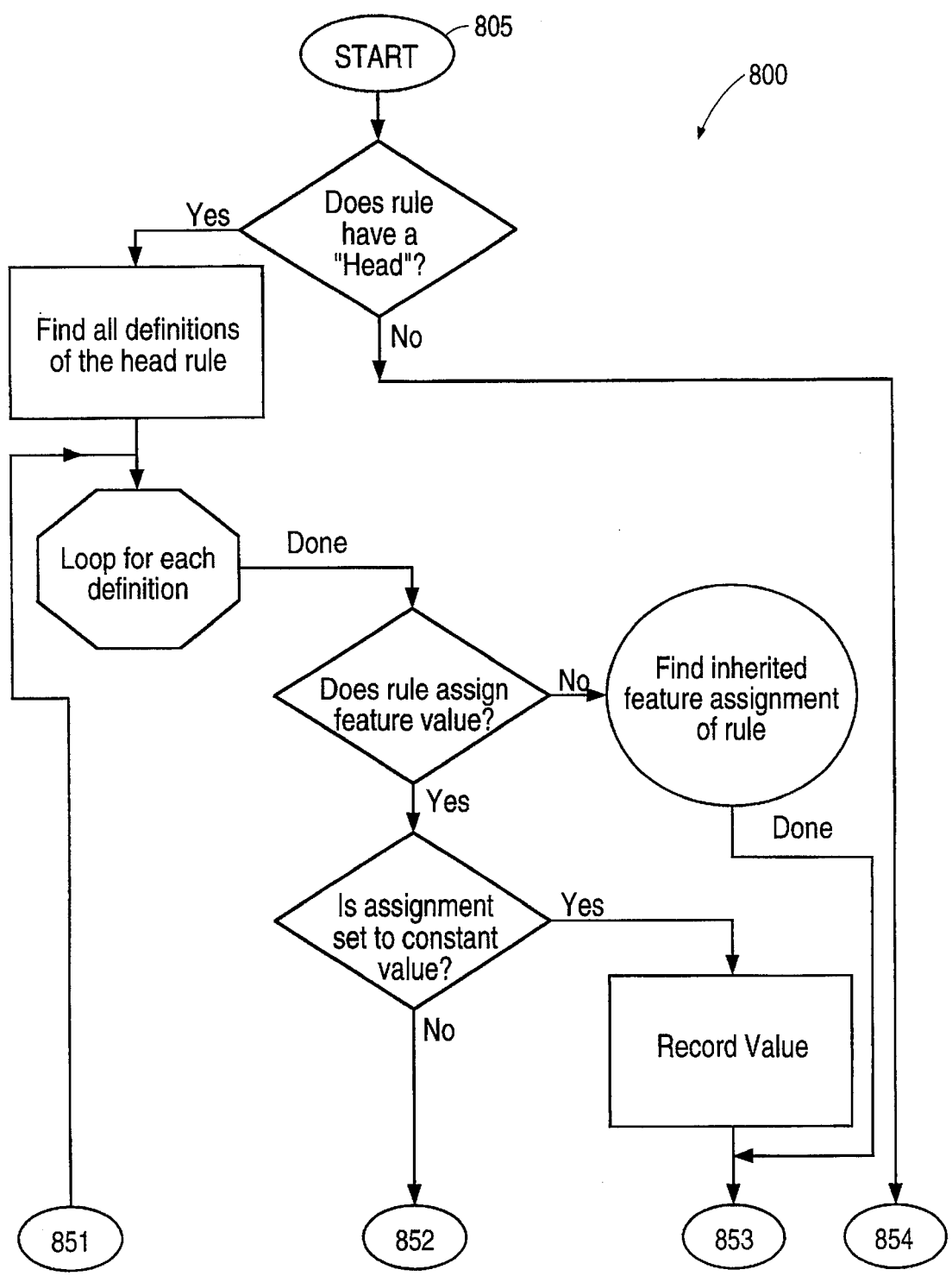
FIGS. 8A and 8B are flowcharts illustrating a method for finding all inherited feature assignment values of a rule.
Figure 8B:
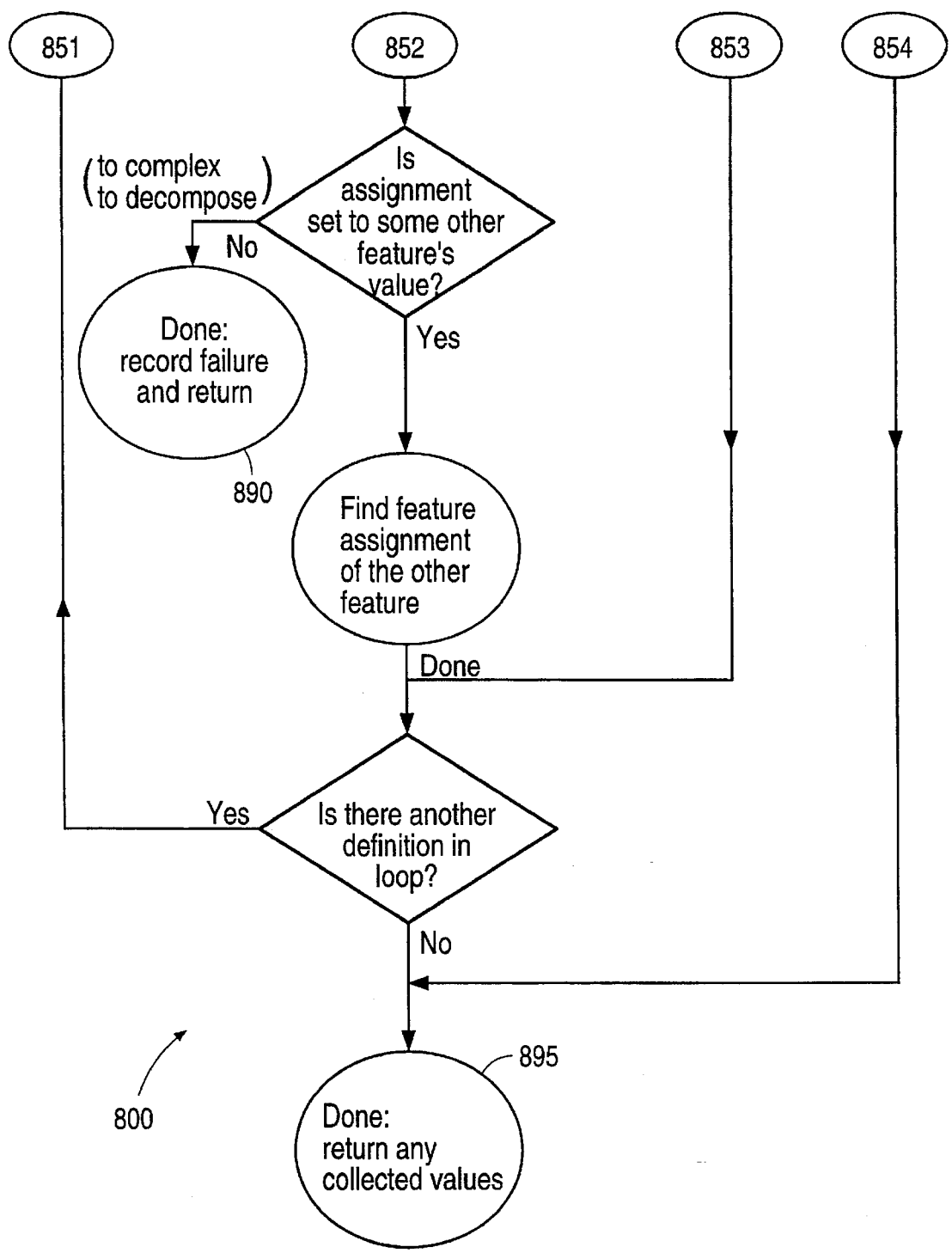

FIGS. 8A and 8B are flowcharts illustrating a method 800 used by UG compiler 350 for finding all inherited feature assignment values of a rule. This search step is repeated until only rules with no other rule name in their patterns are remaining, i.e., it uses, the "recursively expanded set of rules". The rules from which a value is derived become accessible by tracing a path from a rule head to find all the partial rules for that rule, and then repeating the process for each of them recursively. The search ends when there is no "head", either because only lexical elements appear in a pattern, or because of an explicit "no head" declaration.

If no assignments of the feature has occurred in this search, such a rule feature is now known to have been ultimately derived from the original feature values associated with words in the UG lexicon. UG compiler 350 then scans all word senses in the UG lexicon to collect feature values that obey all the rule restrictions that have been expressed for this rule component (box 765). For each set of feature value pair(s), a newly generated rule name is created using a description of the rule restriction and feature value pair. Note that while a feature (e.g., "eye-color") can have many different values, every feature-value pair is unique (e.g., "eye-color =blue").

However, if the rule name is newly created, i.e., not previously defined, and the tested feature value was assigned its value in the action of the rule, but the action assigned that tested feature to a constant value or to a value fetched from another feature which was originally derived from a constant value, then the action augmentation is treated as if that feature value had originally been derived from a lexical source, and processing continues using the assignment values as if they had come from the lexicon to generate the new simple rules (box 780).

If the action references a value from another rule, then the reference is traced through all the layers of copying until a constant value or a reference to another lexical rule component is retrieved. If such a constant value is found, it is processed as if it was directly assigned by the lexicon. Next, the newly created name is adopted for the newly defined rule having the constant value thereby legitimizing the word(s) corresponding to the collected features. Processing of the rule component is now complete (box 770).

Conversely, if the rule name is newly created, i.e., not defined previously, the feature value is assigned by the "action" of some partial rule, and the action is neither set to a constant value nor associated with another feature, then the newly created rule name is adopted (box 785). In this case, the test augmentation associated with this particular feature value is ignored and processing of the rule component is declared complete. This is an example where a test augmentation cannot be precomputed into a final SR grammar form, i.e., fully decomposed, by UG compiler 350 and so results in a rule that allows every word sequences that the original UG rule would allow, including possibly some other word sequences that the UG test would have eliminated.

Whenever a complex rule cannot be fully replaced by simple rules, the more permissive version is used instead. For example, when a test augmentation cannot be computed during the UG compilation, the associate feature value is set to "true". In a more specific example, when compiling a complex UG rule which includes a pattern having a "day-of-the-week" element and a "date" element, it is not possible to pre-complete whether there is going to be a match between the "day-of-the-week" element and the "date" element without prior knowledge of the month and year.

In order to optimize the performance of speech recognizer 320, multiple UG rule restrictions of the unified grammar are combined by decomposing the UG rule restrictions into simple tests which involve only other rules or constant values, and then recomposing the results of lexicalizing each simple test into a new rule with a rule name created to reflect the composite restrictions. The decomposition process is repeated until the only tests involve comparing two simple constant values, each representing a rule component, e.g., an equality test, an inequality test or a set inclusion or exclusion test. UG compiler 350 uses these simplified tests derived from the UG rules, to search through the lexicon to locate words that fit the simplified tests, and then replacing the test in each new rule by creating a corresponding set of permissible words or phrases for the SR grammar.

This decomposition process is more involved when the rule restriction involves comparing features derived from two different components of a rule. To lexicalize this comparison form, UG compiler 350 uses the decomposition rules described above to track the value of each feature to its corresponding ultimate origin in the UG lexicon or in assignments. Next, UG compiler 350 collects all the possible values for each of the two features to be compared, and "maps" through them collecting the combinations that are "true" for the rule restriction that is being replaced. For each "true" combination, a new rule with a new descriptive name is created. The (original) UG rule of the unified grammar which incorporated the test between the features of the two elements of its pattern causes UG compiler 350 to produce a corresponding rule in the SR grammar that disjoins (allowing a choice of any one of) the individual new simple SR rules that are created in the SR grammar by the pairing and mapping process described above. If the newly created rule name is already defined, the existing definition is adopted for the rule in the SR grammar; otherwise the new disjunction becomes that definition for the rule.

In this implementation, "dead ends" are encountered only when "illegal" combinations of feature values remain in a particular portion of a UG rule during recomposition. When this happens, the generated rule is defined to be dependent on a "string-which-cannot-occur" (SWCO) thereby flagging a failure of that particular analysis path. Subsequently, during a "clean-up" phase of the compilation process, UG compiler 350 removes any occurrence of failure flag references within the disjunctions in the SR grammar, provided the "pruning" can accomplished the formalisms supported by the particular SR grammar for the targeted speech recognizer. In the event that limitations on a specific SR grammar formalism dictate that such SWCO string(s) remain in the SR grammar, a special "SWCO" definition is incorporated into the SR grammar for the purpose of "stubbing-out" (masking) any rules having the SWCO string.

Finally, UG compiler 350 loops through every main rule definition and collects all the SR rules generated from each main UG rule for incorporation into the SR grammar. Note that in this implementation, within the resulting SR grammar, SR rules are organized by names derived from each specific main rule name of the parent UG grammar, with the various permissible tagged variants grouped as alternative SR rule definitions. In other words, at the end of the compilation process, the resulting variants for each alternative SR rule definition are disjoined together to produce a (composite) "major" SR rule in the SR grammar corresponding to the major UG rule of the UG grammar. This step yields a more compact SR grammar while retaining recognizable rule names to aid the development and maintenance of the UG description.

Because there is no standard format, a variety of different formalisms are used in input file formats for the commercially available speech recognizers. For example, in this embodiment, UG compiler 350 produces a recognizer-specific SR grammar for speech recognizer 320 (e.g. a .HG file for a Hark speech recognizer). Subsequently, speech recognizer 320 builds an internal SR state machine based on the SR grammar from UG compiler 350.

(vii) Compilation of the Lexicon and Unified Grammar to produce an NL Grammar

For each unified grammar, UG compiler 350 also generates an NL grammar for NL processor 330. As discussed above, in order to eliminate the need for defining every form of each word in a UG lexicon, when lexical processor 350a of generates a (primary) word for the NL grammar, lexical processor 350a also generates the appropriate derivative forms for various categories of words, e.g., nouns, adjectives, and verbs. In contrast, special features, once compiled, are not included in the NL grammar outputted to NL processor 330.

UG compiler 350 produces an instance of each UG rule in the NL grammar, each NL rule beginning with a rule name. The rule name is derived from the UG rule and is either unique or else has a unique tag associated with the name such that the name and tag together form a unique rule identifier. A unique NL rule name or tag identifies each NL rule while sharing the main name with the alternative patterns of the UG rule for ease of writing and debugging the UG rule.

The augmentations of the UG rules and resultant actions derived from "head" declarations are compiled into code segments to be used during processing by NL processor 330.

No precompilation of the augmentations is needed for the NL grammar since the actual augmentations can simply be done during NL processing.

(viii) Operation of the Speech Recognizer

In this embodiment, speech recognizer 320 is a Hark speech recognizer, available from B.B.N., 70 Fawcett Street, Cambridge, Mass. 02138. Other commercially available speech recognizers are available and UG compiler 350 can be adapted by one skilled in the art to operate with different speech recognizers without departing from the spirit of the present invention. Examples of commercially available speech recognizers which operate with UG compiler 350 include Texas Instrument's Dagger and Carnegie Mellon University's Sphinx Ver I. As Hark is commercially available, a description sufficient to illustrate the principles of the invention is included.

Briefly, the SR grammar generated by UG compiler 350 is loaded into speech recognizer 320 during an initialization of speech interpreter 300. Next, speech recognizer 320 matches the input sounds using a vector-quantized Hidden Markoff Model that represents the low-level characteristics of the sounds and relates them to sequences of phonemes as they sound in various contexts. Next, speech recognizer 320 produces a best-guess word sequence by using the internal SR finite state machine previously constructed from the SR grammar. As Hark and other speech recognizers are commercially available, a detailed description of the operation of speech recognizer 320 is not provided.

(iix) Operation of the NL processor

In this embodiment, NL processor 330 named SWIFTUS (SoftWare Instead of Fastus for Text UnderStanding) was written at Sun Microsystems Laboratories, Inc., and it is designed based on a published description of an NL processor called Fastus which was developed by Jerry Hobbs at SRI International, Stanford, Calif. As shown in FIG. 4, NL processor 330 includes a lexical processor 330a, a pattern recognizer 330b and an optional knowledge base 330c.

During the initialization of speech interpreter 300, lexical processor 330a loads all the senses of each word from the UG lexicon into an internal NL lexicon. Note that the NL grammar includes references to lexical information from the UG lexicon, and rules with their augmentations from the UG grammar. The internal NL lexicon provides NL processor 330 with a concise, extensible and portable structure for defining the meaning of the vocabulary words. These NL lexical word entries encode the feature value pairs from the UG lexicon as structures that are compatible with the structures used to represent matched UG rules.

As discussed above, some word entries, e.g., "contractions of", require special handling, and are converted to special NL rules which are transparent to the UG grammar. The UG and NL word entry structures are logically similar. Both general and domain-specific NL lexicons can be used by UG compiler 350 to facilitate the economy derived from sharing general NL lexicons in implementations supporting multiple user applications.

Lexical processor 330a also includes an extensible set of predefined morphology-generating NL routines. These NL routines define the most common derived forms of an input vocabulary by using a predefined set of NL rules of English language morphology, unless specifically instructed otherwise by a defined irregular form specification. Root forms of each derived word sense are maintained for matching within NL patterns. Acronyms and alternative spellings are declared within word entries. In this implementation, multi-word entries representing a single concept, e.g. "United States of America", can be entered as a phrase separated by hyphens, with corresponding NL rules automatically generated for recognizing the same phases when their words appear un-hyphenated, i.e., as separate words in a contiguous sequence.

Pattern recognizer 330b includes pattern recognition routines for comparing the set of NL patterns generated from the NL grammar with the incoming words from speech recognizer 320. In this implementation, NL patterns are quadruples derived from the NL grammar, with a name, a pattern body, and a pair of augmentations expressed in Lisp. Pattern recognizer 330b is essentially a cascaded finite-state automata (FSA) based system which evaluates the augmentations while matching each associated pattern. As described in detail above, common expression operators such as optionality, disjunctive OR, Kleene plus and star are supported. Note that pattern recognizer 330b is formally (at least) Context Free Grammar (CFG) equivalent because an NL word pattern can be defined by recursively referring to other NL word patterns.

During the initialization sequence of this embodiment, NL processor 330 processes the NL grammar containing NL rule definitions to produce the executable FSA-based system using algorithms published by Aho and Ullman (see "Compiler Construction") with each NL rule of the NL grammar associated with a pattern name based on its major rule name. In other words, rules of the NL grammar loaded into pattern recognizer 330b result in the construction of corresponding FSAs. NL pattern matches on lexical word entries are converted into compiled LISP functions attached to FSA arcs, which are transversed if pattern recognizer 330b accepts the current input of word senses and previously-matched NL patterns as "true" arguments to the compiled functions.

When pattern recognizer 330b has successfully matched the NL word patterns against an input word sequence from speech recognizer 320 i.e., all the pattern tests are "true", then the NL processor 330 evaluates the first set of augmentations of the rule (the "tests"). If the first set of augmentations succeeds, then the input sequence is "recognized", and the resulting form is produced and filled in by evaluating the second set of augmentations associated with the rule (the "action"). (Note that "head" actions from the original UG grammar have become part of the "action" augmentations in the NL grammar.) The matching result can then used for other pattern matches, passing along the feature-value pairs associated with it. The process continues until all the possible matches have been made, then returns the ones that are marked as "top level" patterns (these are the ones designed to cover a complete sentence).

Pattern recognizer 330b processes the words of the input word sequence by a combination of testing each word, its root, its part of speech, its knowledge-base class (directly or by subsumption), by matching against feature-value pairs in the lexicon, or by the negation of any of the above tests. Recognizer 330b also allows arbitrary functions to serve as predicates for these tests. The names used by the augmentations to refer to the parts of the NL patterns are derived from the NL patterns themselves or by adding optional tags to elements of the NL pattern. In addition, the use of wildcards in the NL patterns provides a backup mechanism for extracting key features out of an input word sequence that was not fully recognized by speech recognizer 320. By seeking "key" words, wildcards can serve to abate the inherent inaccuracy of the present generation of speech recognizers. Note that a sense structure with a null definition is examined for word entries not defined in the NL lexicon so that predicate checks for words and wildcards are possible.

Pattern recognizer 330b also supports multiple matching of its NL patterns in separate "passes", where the rule to be used in passes after the first pass are marked with local declarations in the UG grammar. A set of second-pass patterns is used when the "first pass" patterns yield no matches. This "safety net" of secondary (or tertiary, etc.) patterns is generally "looser" than the primary set of NL patterns. For example, one secondary pass pattern only attempts a match of selected keyword such as "email". Because a match with a primary pattern is preferred, the secondary patterns are segregated and invoked only if the top-level matches of the first pass patterns fail.

Speech recognizer 320 provides a best guess of a permissible sequence of words spoken to NL processor 330 which parses the input words using the constructed FSA network and its augmentations applying a top-down recursive matching algorithm. For each unique match that succeeds for the particular pattern named the "top-level" a resultant feature-value structure of that pattern is returned. All patterns which should cover a whole sentence are defined as alternative ways to match the "top-level " pattern, so this means that any rule designated to cover a whole sentence and which does match, leaving no "leftovers", causes a resultant feature-value structure to be returned for use by the applications translator.

Note that the optional knowledge base 330c includes one or more knowledge bases and supports simple subsumption and inheritance routines. The knowledge bases include both general and subject-specific versions, and can be used to capture semantic generalizations inappropriate for incorporation into the lexicon, such as marking a hierarchy of semantic classes, e.g., "display actions", "display", "show" and "present", to support testing of patterns. The knowledge base is optional, and generally is not needed in user application where simpler markings in the UG lexicon will suffice.

(ix) Alternative Embodiments

Figure 3B:
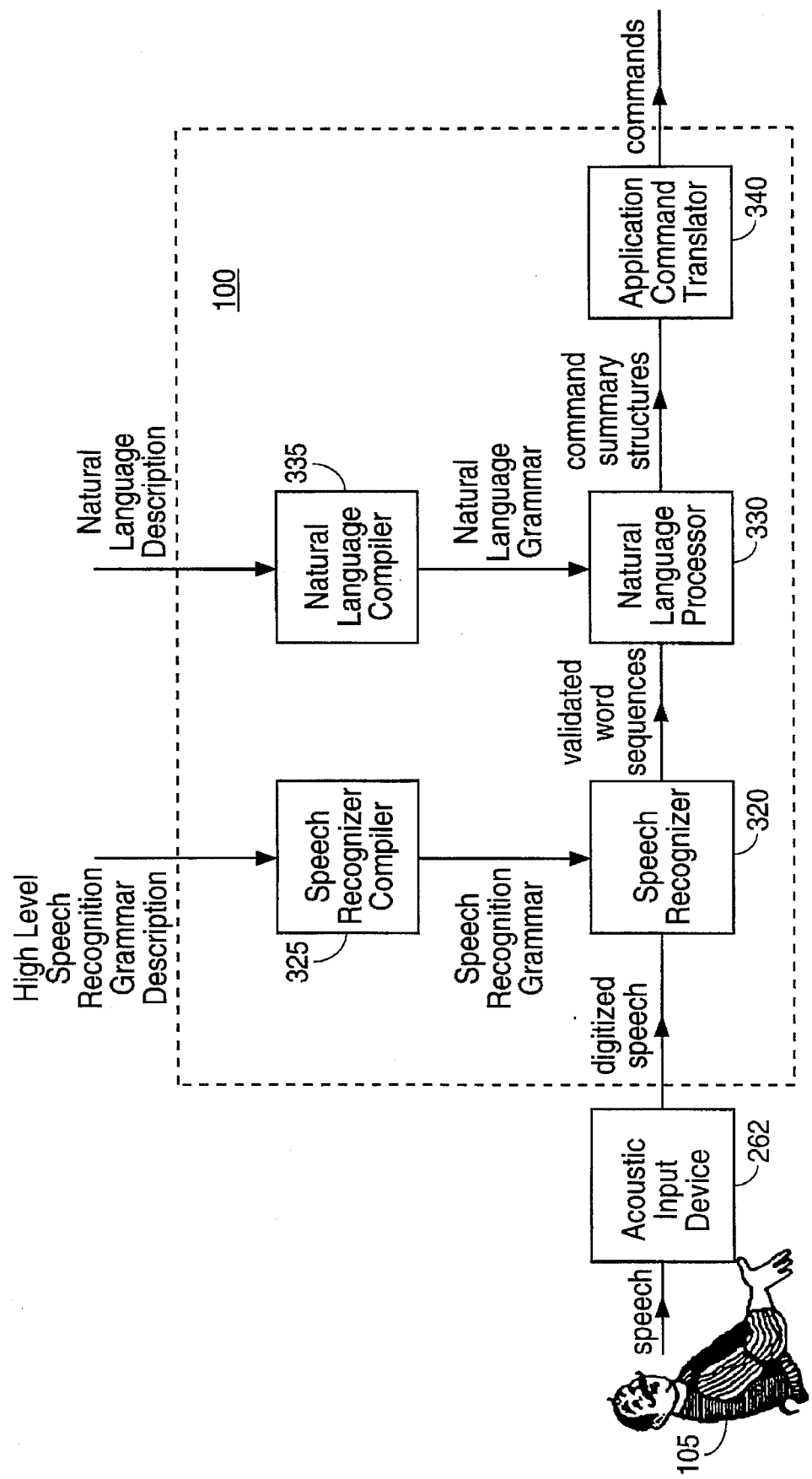
FIG. 3B diagram showing another embodiment of the speech interpreter.
Figure 3C:
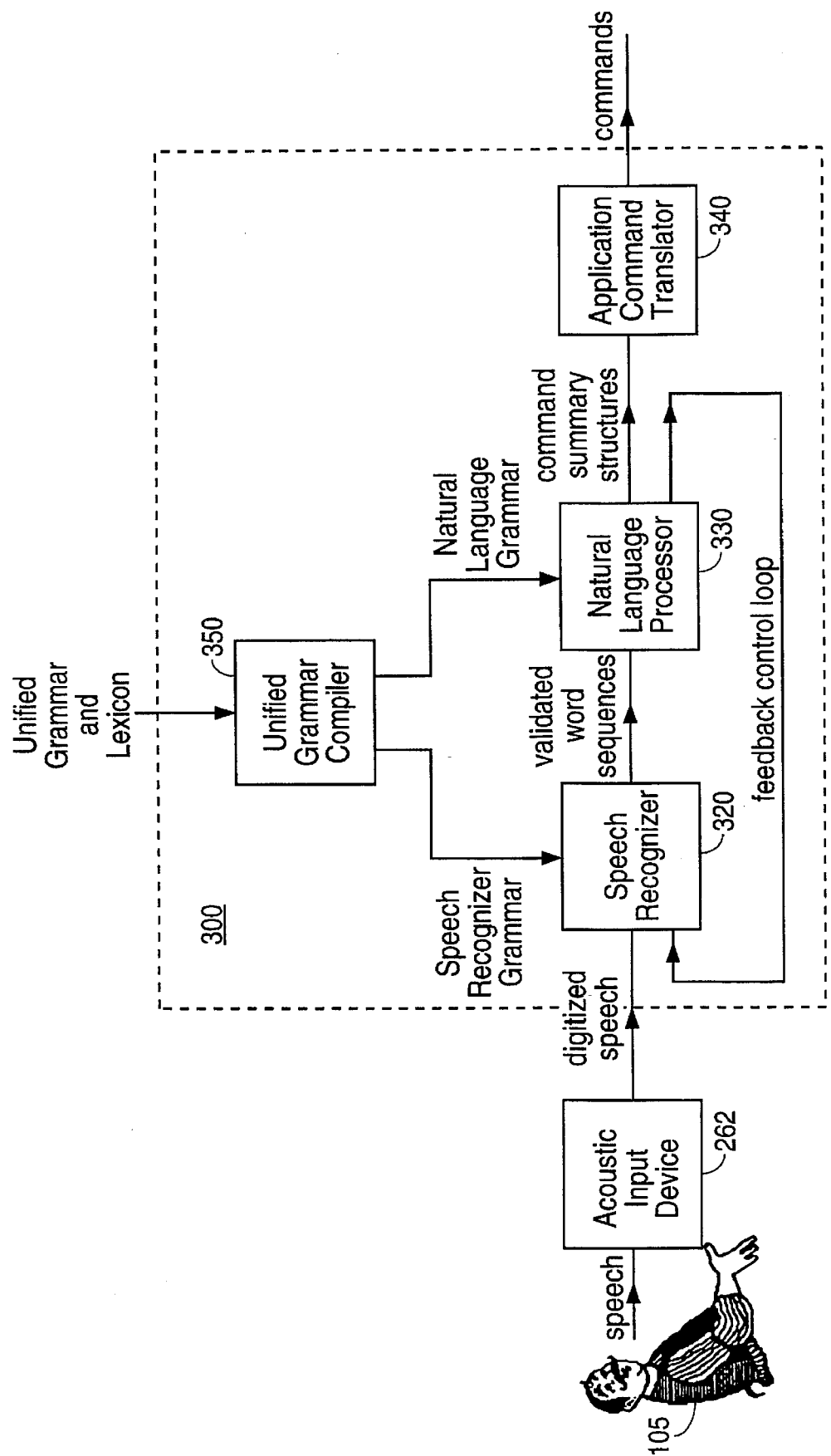
FIG. 3C Block diagram showing yet another embodiment of the speech interpreter.

In this embodiment, speech interpreter 300 is coupled to a speech synthesizer (not shown) which converts the message generated by the user application programs and the text stored in the calendar manager and/or email system into spoken prompts and responses for the user application. In addition, a textual output from NL processor 330 may be preserved in a written form, e.g., ASCII. In another embodiment, as illustrated by the block diagram of FIG. 3B, an SR grammar and an NL grammar are generated separately by SR compiler 325 and NL compiler 335, respectively. In yet another embodiment, as illustrated by the block diagram of FIG. 3C, speech recognizer 320 also receives feedback from NL processor 330, enabling NL processor 330 to, for example, reject a validated word sequence from speech recognizer 320 and request speech recognizer 320 to forward another (next best guess) validated word sequence. This is a powerful feature that integrates speech interpretation into the speech recognition process.

Other modifications are possible. For example, in a voice mail system, speech interpreter 300 is coupled to a digital or analog audio recorder to preserve the speech for playback. Alternatively, interpreter 300 is coupled to both a speech synthesizer and/or coupled to a video player/recorder for a video-on-demand system. Other applications for which the grammar produced by UG compiler 350 can be adapted for use include phonetic and picture writing recognition systems for transcribing shorthand or stenography, recognizing handwriting, or recognizing picture-writing such as Chinese/ Japanese characters. In general, any human-generated input which represents a language may be used as an input to the recognition system.

What is claimed is:

1. A method for converting a lexicon and a unified grammar (UG) description into a speech recognition (SR) grammar for controlling a speech recognizer, the lexicon including a plurality of UG word entries having predefined characteristics and the UG description including a plurality of UG rules, each UG rule having at least one augmentation, the UG rules defining grammatically allowable word sequences, the method being implemented as a plurality of program instructions and data stored in a memory of a system including a central processing unit (CPU) with the memory coupled to the CPU, a system bus coupled to the CPU, and an input means coupled to the system bus for receiving a digital signal representative of an acoustic signal, the method including the steps of:

generating from the lexicon a plurality of SR word entries in said SR grammar corresponding to said plurality of UG word entries;

generating from the lexicon and the UG description a plurality of permissible SR word sequences and a plurality of SR rules in said SR grammar, said SR word sequences and said SR rules corresponding to the augmentations of said UG rules; and storing said SR word entries, said permissible SR word sequences and said SR rules in the memory.

2. The method of claim 1 wherein said step of generating said SR word sequences includes the step of generating at least one said permissible SR word sequence for each grammatically allowable word sequence defined by at least one said UG rule, and wherein at least one word of at least one of said permissible SR word sequences is selected from said UG word entries by matching a predefined characteristic of said selected word to an element of one of said UG rules.

3. The method of claim 1 wherein said step of generating said SR word sequences include the step of generating one said SR rule corresponding to at least two of said grammatically allowable word sequences defined by one of said UG rules.

4. The method of claim 1 wherein said speech recognizer comprises a second plurality of program instructions and data stored in the memory.

5. The method of claim 1 wherein said speech recognizer comprises a plurality of program instructions and data stored in a second memory of a second computer system.

6. The method of claim 1 further comprising the step of generating a plurality of derivative word forms in said SR grammar corresponding to said plurality of UG word entries.

7. The method of claim 1 further comprising the step of generating a natural language (NL) grammar for controlling an NL processor coupled to said speech recognizer.

8. The method of claim 7 further comprising the step of propagating the predefined characteristic of said selected word to the NL processor.

9. The method of claim 1 wherein an element of one of said plurality of SR rules refers to another one of said plurality of SR rules.

10. The method of claim 1 wherein the step of generating SR rules includes the step of converting the UG description into a LISP format.

11. The method of claim 1 wherein the step of generating a first SR rule includes the step of assigning a true value to a feature associated with the corresponding UG rule.

12. A method for recognizing a digitized acoustic signal with a speech recognizer controlled by a speech recognition (SR) grammar corresponding to a lexicon and a unified grammar (UG) description, the lexicon including a plurality of UG word entries having predefined characteristics and the UG description including a plurality of UG rules, each UG rule having at least one augmentation, the UG rules defining grammatically allowable word sequences, the method being implemented as a plurality of program instructions and data stored in a memory of a system including a central processing unit (CPU) with the memory coupled to the CPU, a system bus coupled to the CPU, and an input means coupled to the system bus for receiving the digitized acoustic signal, the method including the steps of:

generating from the lexicon a plurality of SR word entries in said SR grammar corresponding to said plurality of UG word entries;

generating from the lexicon and the UG description a plurality of permissible SR word sequences and a plurality of SR rules in said SR grammar, said permissible SR word sequences and said SR rules corresponding to the augmentations of said UG rules; and comparing the digitized acoustic signal with said SR word entries, said SR word sequences and said SR rules for generating a validated word sequence corresponding to the digitized acoustic signal for a natural language processor.

13. The method of claim 12 wherein said step of generating said SR word sequences include the step of generating at least one said permissible SR word sequence for each grammatically allowable word sequence defined by one of said UG rules, and wherein at least one word of at least one of said permissible SR word sequences is selected from said UG word entries by matching a predefined characteristic of said selected word to an element of one of said UG rules.

14. The method of claim 12 wherein said step of generating said SR word sequences include the step of generating one said SR rule corresponding to at least two of said grammatically allowable word sequences defined by one of said UG rules.

15. The method of claim 12 wherein said speech recognizer comprises a second plurality of program instructions and data stored in the memory.

16. The method of claim 12 wherein said speech recognizer comprises a plurality of program instructions and data stored in a second memory of a second computer system.

17. The method of claim 12 further comprising the step of generating a plurality of derivative word forms in said SR grammar corresponding to said plurality of UG word entries.

18. The method of claim 12 further comprising the step of generating a natural language (NL) grammar for controlling an NL processor coupled to said speech recognizer.

19. The method of claim 18 further comprising the step of propagating the predefined characteristic of said selected word to the NL processor.

20. The method of claim 12 wherein an element of one of said plurality of SR rules refers to another one of said plurality of SR rules.

21. The method of claim 12 wherein the step of generating SR rules includes the step of converting the UG description into a LISP format.

22. The method of claim 12 wherein the step of generating a first said SR rule includes the step of assigning a true value to a feature associated with the corresponding UG rule.

23. An apparatus for converting a lexicon and a unified grammar (UG) description into a speech recognition (SR) grammar for controlling a speech recognizer, the lexicon including a plurality of UG word entries having predefined characteristics, the UG description including a plurality of UG rules, each UG rule having at least one augmentation, the UG rules defining grammatically allowable word sequences, the apparatus incorporated within a system including a central processing unit (CPU), a memory coupled to the CPU, a system bus coupled to the CPU, and an input means coupled to the system bus for receiving a digital signal representative of an acoustic signal, the apparatus comprising:

a lexical processor for generating from the lexicon a plurality of SR word entries corresponding to said plurality of UG word entries; and a sequence and rule generator for generating from the lexicon and the UG description a plurality of permissible SR word sequences and a plurality of SR rules in said SR grammar, said permissible SR word sequences and said SR rules corresponding to the augmentations of said UG rules.

24. The apparatus of claim 23 wherein at least one word of at least one of said permissible SR word sequences is selected from said UG word entries by matching a predetermined characteristic of said selected word to an element of one of said UG rules.

25. The apparatus of claim 23 wherein one said SR rule corresponds to at least two of said grammatically allowable word sequences defined by one of said UG rules.

26. The apparatus of claim 23 wherein said speech recognizer comprises a second plurality of program instructions and data stored in the memory.

27. The apparatus of claim 23 wherein said speech recognizer comprises a plurality of program instructions and data stored in a second memory of a second computer system.

28. The apparatus of claim 23 wherein said lexical processor further generates a plurality of derivative word forms in said SR grammar corresponding to said plurality of UG word entries.

29. The apparatus of claim 23 further comprising a natural language (NL) generator for generating an NL grammar for controlling an NL processor coupled to said speech recognizer.

30. The apparatus of claim 29 wherein said speech recognizer propagates the predefined characteristic of said selected word to the NL processor.

31. The apparatus of claim 23 wherein an element of one of said plurality of SR rules refers to another one of said plurality of SR rules.

32. The apparatus of claim 23 further comprising a parser for converting the UG description into a LISP format.

33. The apparatus of claim 23 wherein a feature associated with the corresponding UG rule is assigned a true value for generating one said SR rule.

34. A speech recognition system for recognizing a digitized acoustic signal, said system controlled by a speech recognition (SR) grammar corresponding to a lexicon and a unified grammar (UG) description, the lexicon including a plurality of UG word entries having characteristics, the UG description including a plurality of UG rules defining grammatically allowable word sequences, said system comprising:

a central processing unit (CPU);

a memory coupled to the CPU;

a system bus coupled to the CPU;

an acoustic input device coupled to the system bus for receiving the digitized acoustic signal;

a lexical processor for generating from the lexicon a plurality of SR word entries corresponding to said plurality of UG word entries; and a sequence and rule generator for generating from the lexicon and the UG description a plurality of permissible SR word sequences and a plurality of SR rules in said SR grammar, said permissible SR word sequences and said SR rules corresponding to the augmentations of said UG rules.

35. The apparatus of claim 34 wherein at least one word of at least one of said permissible SR word sequences is selected from said UG word entries by matching a predetermined characteristic of said selected word to an element of one of said UG rules.

36. The apparatus of claim 34 wherein one said single SR rule corresponds to at least two of said grammatically allowable word sequences defined by one of said UG rules.

37. The apparatus of claim 34 wherein said lexical processor further generates a plurality of derivative word forms in said SR grammar corresponding to said plurality of UG word entries.

38. The apparatus of claim 34 further comprising a natural language (NL) generator for generating an NL grammar for controlling an NL processor coupled to said speech recognizer.

39. The apparatus of claim 38 wherein said speech recognition system propagates the predefined characteristic of said selected word to the NL processor.

40. The apparatus of claim 34 wherein an element of one of said plurality of SR rules refers to another one of said plurality of SR rules.

41. The apparatus of claim 34 further comprising a parser for converting the UG description into a LISP format.

42. The apparatus of claim 34 wherein a feature associated with the corresponding UG rule is assigned a true value for generating one said SR rule.

43. The method of claim 18 further comprising the step of providing feedback from said NL processor to said speech recognizer.

44. The method of claim 43 further comprising the step of providing a second validated word sequence to said NL processor.

45. The apparatus of claim 29 further comprising a feedback loop between said NL processor and said speech recognizer for causing said speech recognizer to provide a second validated word sequence.

* * * * *